(12) United States Patent
Kikuchi et al.

(10) Patent No.: US 9,968,984 B2
(45) Date of Patent: May 15, 2018

(54) POROUS METAL BODY MANUFACTURING METHOD AND POROUS METAL BODY

(71) Applicant: FUJI FILTER MANUFACTURING CO., LTD., Tokyo (JP)

(72) Inventors: Kiyohisa Kikuchi, Sakura (JP); Satoshi Arai, Sakura (JP)

(73) Assignee: FUJI FILTER MANUFACTURING CO., LTD., Tokyo (JP)

( * ) Notice: Subject to any disclaimer, the term of this patent is extended or adjusted under 35 U.S.C. 154(b) by 0 days. days.

(21) Appl. No.: 15/314,835

(22) PCT Filed: Aug. 12, 2015

(86) PCT No.: PCT/JP2015/072856
§ 371 (c)(1),
(2) Date: Nov. 29, 2016

(87) PCT Pub. No.: WO2013/024616
PCT Pub. Date: Feb. 18, 2016

(65) Prior Publication Data
US 2017/0197242 A1    Jul. 13, 2017

(30) Foreign Application Priority Data

Aug. 12, 2014 (JP) ................................ 2014-164101
Aug. 29, 2014 (JP) ................................ 2014-174925

(51) Int. Cl.
*B21F 27/18* (2006.01)
*B01D 39/12* (2006.01)
*B60R 21/26* (2011.01)

(52) U.S. Cl.
CPC .............. *B21F 27/18* (2013.01); *B01D 39/12* (2013.01); *B60R 2021/26011* (2013.01)

(58) Field of Classification Search
CPC ........ B21D 15/02; B21D 15/04; B21D 15/06; B21D 17/04; B21D 51/12; B21F 27/121;
(Continued)

(56) References Cited

U.S. PATENT DOCUMENTS

| 629,245 A | * | 7/1899 | Frank ..................... B21D 17/04 72/112 |
| 1,964,289 A | * | 6/1934 | Harrah .................. B21C 37/124 138/122 |

(Continued)

FOREIGN PATENT DOCUMENTS

| GB | 2333470 A | 7/1999 |
| JP | S52-145614 A | 12/1977 |

(Continued)

OTHER PUBLICATIONS

Extended European Search Report issued in corresponding EP Patent Application No. 15831367.6, dated May 15, 2017.
(Continued)

*Primary Examiner* — Edward Tolan
(74) *Attorney, Agent, or Firm* — McDermott Will & Emery LLP

(57) ABSTRACT

A porous metal body is manufactured by which a flow rate of a fluid flowing in an axial direction and a radial direction of the porous metal body can be equalized in the circumferential direction of the porous metal body, and a strength of the porous metal body can be increased. The manufacturing can include at least a step of preparing an intermediary body made of a tubular wire mesh, a star-shaped polygonal body forming step of forming a star-shaped polygonal body by alternately forming, in a circumferential direction of the intermediary body, a plurality of protrusions protruding radially outwards and a plurality of recesses receding radially inwards, and a molding step of inserting the star-shaped polygonal body into a mold that restricts an (Continued)

inner peripheral side and an outer peripheral side of the star-shaped polygonal body and compressing the star-shaped polygonal body from one side in an axial direction of the star-shaped polygonal body.

9 Claims, 18 Drawing Sheets

(58) Field of Classification Search
CPC ........ B21F 27/18; B21F 27/00; B21C 37/202; B21C 37/207; B01D 39/12; B01D 39/10; B60R 2021/26011
See application file for complete search history.

(56) References Cited

U.S. PATENT DOCUMENTS

| | | | | |
|---|---|---|---|---|
| 2,205,893 A * | 6/1940 | Unger | ................... | B21D 15/02 29/890.045 |
| 2,334,263 A | 11/1943 | Hartwell | | |
| 2,680,284 A | 6/1954 | Markowski et al. | | |
| 3,407,638 A * | 10/1968 | Greis | ................... | B21D 15/02 72/105 |
| 3,630,058 A * | 12/1971 | Kiplinger | ................... | B21C 3/08 72/100 |
| 3,690,606 A * | 9/1972 | Pall | ................... | B01D 39/12 210/510.1 |
| 3,824,826 A * | 7/1974 | Charvet | ................... | B21D 15/04 72/77 |
| 4,470,290 A * | 9/1984 | Jungesjo | ................... | B21D 15/02 29/893.34 |
| 4,683,010 A | 7/1987 | Hartmann | | |
| 5,849,054 A * | 12/1998 | Fujisawa | ................... | B01D 46/24 280/740 |
| 6,196,581 B1 | 3/2001 | Katsuda et al. | | |
| 6,277,166 B2 * | 8/2001 | Zettel | ................... | B01D 46/10 280/736 |
| 6,866,693 B2 * | 3/2005 | Igarashi | ................... | B01D 46/0057 55/385.3 |
| 7,637,979 B2 * | 12/2009 | Ushikoshi | ................... | B01D 39/086 55/522 |
| 8,337,182 B2 * | 12/2012 | Lee | ................... | F04C 2/1075 418/1 |

FOREIGN PATENT DOCUMENTS

| | | |
|---|---|---|
| JP | H03-151011 A | 6/1991 |
| JP | H10-119705 A | 5/1998 |
| JP | H11-197422 A | 7/1999 |
| JP | H11-244629 A | 9/1999 |
| JP | 2001-071081 A | 3/2001 |
| JP | 2011-218400 A | 11/2011 |
| JP | 2012-120954 A | 6/2012 |

OTHER PUBLICATIONS

Search Report issued in corresponding International Patent Application No. PCT/JP2015/072856, dated Nov. 2, 2015.
Written Opinion issued in corresponding International Patent Application No. PCT/JP2015/072856, dated Nov. 2, 2015.
Office Action issued in corresponding Japanese Patent Application No. 2016-542605, dated Dec. 13, 2016.

* cited by examiner (A)

(B)

POROUS METAL BODY MANUFACTURING METHOD AND POROUS METAL BODY

CROSS REFERENCE

This application is the U.S. National Phase under 35 US.C. § 371 of International Application No. PCT/JP2015/072856, filed on Aug. 12, 2015, which claims the benefit of Japanese Application No. 2014-164101, filed on Aug. 12, 2014 and Japanese Application No. 2014-174925, filed on Aug. 29, 2014, the entire contents of each are hereby incorporated by reference.

FIELD OF THE INVENTION

The present invention relates to a porous metal body manufacturing method and a porous metal body, and more specifically relates to a porous metal body manufacturing method wherein a tubular body formed by knitting a metal wire is machined, and a porous metal body.

BACKGROUND ART

A porous body is used in various applications, such as filters, cooling members, and muffling members. When a porous body is used as a filter, for example, the porous body filters or captures impurities contained in a fluid.

An airbag system is an example of a system that uses a porous body as a filter. The airbag system comprises an inflator (gas producing device) that produces gas by burning a powder. The airbag system is a system that inflates an airbag by supplying the gas produced by the inflator to an airbag incorporated into a steering wheel or the like. The porous body used in such an airbag system captures combustion remnants produced when the inflator burns the powder, cools the produced gas, and thus prevents the airbag from becoming damaged. Methods for manufacturing this porous body have been proposed in various literature to date.

The manufacturing method proposed in Patent Document 1 is a method for manufacturing a porous body from a wire mesh body formed by plain-knitting a metal wire. This manufacturing method comprises the steps of forming a preliminary tubular wire mesh body using a tubular wire mesh body formed by plain-knitting a metal wire, molding a small-diameter tubular wire mesh body obtained by reducing a diameter of this preliminary tubular wire mesh body by a drawing process, cutting the small-diameter tubular wire mesh body to a predetermined length, compressing the cut small-diameter tubular wire mesh body in a longitudinal direction and molding the wire mesh body into a cylindrical intermediary molded wire mesh body, and further compressing the cylindrical intermediary molded wire mesh body in the longitudinal direction and molding the wire mesh body into a cylindrical molded wire mesh body.

The manufacturing method proposed in Patent Document 2 comprises the steps of plain-knitting a metal wire to form a cylindrical wire mesh, forming a hollow cylindrical wire mesh body by winding a band-shaped body obtained by folding this wire mesh around a core member, and compressing this cylindrical wire mesh body by applying pressure from both sides in an axial direction thereof.

PATENT DOCUMENTS

Patent Document 1: Japanese Laid-Open Patent Application No. H11-197422

Patent Document 2: Japanese Laid-Open Patent Application No. H11-244629

SUMMARY OF THE INVENTION

Problems to be Solved by the Invention

Nevertheless, the porous bodies manufactured by the manufacturing methods proposed in Patent Document 1 and Patent Document 2 are merely manufactured by simply compressing a tubular wire mesh in the longitudinal direction (axial direction) thereof. As a result, pores that exist in the interior of the porous body may not be equally distributed in a circumferential direction. With a porous body in which the pores are not equally distributed in the circumferential direction, when a fluid is made to flow from one side to the other side in an axial direction or in a radial direction of the porous body, the fluid may not flow equally in the circumferential direction of the porous body. Further, without the pores in the interior of the porous body being equally distributed, it is difficult to manufacture a porous body having high strength.

The present invention was designed to solve the above problems, and it is therefore an object of the present invention to provide a porous metal body manufacturing method by which a flow rate of a fluid flowing in an axial direction and a radial direction of a porous metal body can be equalized in a circumferential direction of the porous metal body and a strength of the porous metal body can be increased, and to provide a porous metal body.

Means for Solving the Problems

A porous metal body manufacturing method according to the present invention for solving the above-described problems comprises at least a preparation step of preparing an intermediary body made of a tubular wire mesh, a star-shaped polygonal body forming step of forming a star-shaped polygonal body by alternately forming, in a circumferential direction of the intermediary body, a plurality of protrusions protruding radially outwards and a plurality of recesses receding radially inwards, and a molding step of inserting the star-shaped polygonal body into a mold that restricts an inner peripheral side and an outer peripheral side of the star-shaped polygonal body and compressing the star-shaped polygonal body from one side in an axial direction of the star-shaped polygonal body According to this invention, the porous metal body is manufactured through each step described above, making it possible to manufacture a porous metal body having high strength, and equalize a flow rate of a fluid flowing in the axial direction and the radial direction of the porous metal body in the circumferential direction of the porous metal body. In particular, through the star-shaped polygonal body forming step described above, pores between metal wires that exist within the wire mesh constituting the intermediary body are equally distributed in the circumferential direction. This makes it possible to equally distribute the pores that exist in the interior of the completed porous metal body in the circumferential direction. Further, this star-shaped polygonal body forming step causes plastic deformation of the wire mesh constituting the intermediary body. As a result, the strength of the completed porous metal body is improved.

In the porous metal body manufacturing method according to the present invention, the preparation step is a step of knitting a metal wire to form a tubular wire mesh, and forming a tubular intermediary body comprising an inner peripheral portion and an outer peripheral portion from the wire mesh. The mold used in the molding step is configured by a core member that restricts an inner peripheral side of the star-shaped polygonal body, and an outer peripheral wall that restricts an outer peripheral side of the star-shaped polygonal body, and is configured to be changeable to at least two forms differing in length in an axial direction thereof. The molding step comprises at least a first pressing step of compressing the star-shaped polygonal body from one side in the axial direction using the mold of a form having a long length in the axial direction and, after the first pressing step, a second pressing step of further compressing the star-shaped polygonal body from one side in the axial direction using the mold of a form having a short length in the axial direction.

According to this invention, the tubular wire mesh prepared in the preparation step described above is formed by knitting the wire, making it possible to form a wire mesh with excellent machinability. Further, in the molding step, the star-shaped polygonal body is inserted into the mold comprising the core member and the outer peripheral wall as described above, making it possible to reliably restrict the inner peripheral side and the outer peripheral side of the star-shaped polygonal body. Further, the molding step described above includes the first pressing step and the second pressing step, making it possible to exert a compressing action equivalent to pressing the star-shaped polygonal body from both sides in the axial direction of the mold on the star-shaped polygonal body by pressing the star-shaped polygonal body from only one side in the axial direction of the mold in both the first pressing step and the second pressing step. That is, by simply providing an actuator for pressing the star-shaped polygonal body on only one side in the axial direction of the mold, it is possible to achieve the same action as that when an actuator for pressing the star-shaped polygonal body is provided on both sides in the axial direction of the mold.

In the porous metal body manufacturing method according to the present invention, the star-shaped polygonal body forming step is a step of forming the star-shaped polygonal body by pressing a plurality of tabs that are regularly spaced apart in the circumferential direction and move in the radial direction on the intermediary body from an outer side in a radial direction of the intermediary body, thereby forming the recesses in positions where the tabs were pressed and forming the protrusions in positions between the tabs.

According to this invention, the star-shaped polygonal body forming step is performed as described above, making it possible to form recesses receding radially inward in a plurality of sections where the tabs were pressed, and form protrusions protruding radially outward in a plurality of sections between the sections where the tabs were pressed. This makes it possible to efficiently form the star-shaped polygonal body by pressing the plurality of tabs on the intermediary body all at once.

In the porous metal body manufacturing method according to the present invention, the star-shaped polygonal body forming step is a step of forming the star-shaped polygonal body by engaging a first gear disposed on an outer side of the intermediary body and a second gear disposed on an inner side of the intermediary body while moving the intermediary body in the circumferential direction, thereby forming the recesses in positions of the intermediary body corresponding to tooth ridges of the first gear and forming the protrusions in positions of the intermediary body corresponding to tooth ridges of the second gear.

According to this invention, the star-shaped polygonal body forming step is performed as described above, making it possible to form the star-shaped polygonal body by simply engaging two gears. This makes it possible to form the star-shaped polygonal body using a simple device. Further, a star-shaped polygonal body having a different number of recesses and protrusions can be formed by simply replacing the gears with those having a different number of teeth.

In the porous metal body manufacturing method according to the present invention, the star-shaped polygonal body forming step is a step of forming the star-shaped polygonal body by diagonally inclining the plurality of protrusions and the plurality of recesses with respect to the axial direction of the intermediary body.

According to this invention, the star-shaped polygonal body is formed by diagonally inclining the plurality of protrusions and the plurality of recesses with respect to the axial direction of the intermediary body in the star-shaped polygonal body forming step, and thus in a section in the circumferential direction, the protrusions exist in one region in the axial direction and the recesses exist in another region in the axial direction when the star-shaped polygonal body is formed. As a result, when the formed star-shaped polygonal body is viewed in a planar view, the protrusions overlap with the positions of the recesses in the circumferential direction of the star-shaped polygonal body, and a density of the star-shaped polygonal body becomes equal in the circumferential direction. This makes it possible to equalize the density in the circumferential direction of the porous metal body completed through the molding step.

In the porous metal body manufacturing method according to the present invention, the core member and the outer peripheral wall each comprise a main body portion and a length adjusting portion removable from the main body portion. In the first pressing step, the star-shaped polygonal body is compressed using the mold made of the core member and the outer peripheral wall with the length adjusting portions assembled with the main body portions. In the second pressing step, the star-shaped polygonal body is compressed using the mold made of the core member and the outer peripheral wall with the length adjusting portions removed from the main body portions.

According to this invention, the mold used in the molding step is configured as described above, making it possible to press the star-shaped polygonal body from one side in the axial direction of the mold having a long form in the first pressing step, and press the star-shaped polygonal body from one side in the axial direction of the mold having a short form in the second pressing step, by changing the form of the mold.

In the porous metal body manufacturing method according to the present invention, the preparation step may include a wire mesh continuous body forming step of forming a tubular wire mesh continuous body continuous in the axial direction by knitting a metal wire, a dividing step of dividing the wire mesh continuous body into a plurality of tubular wire mesh bodies having a fixed length in the axial direction, and an intermediary body forming step of forming the intermediary body by folding a side wall portion of the tubular wire mesh body in the axial direction.

According to this invention, the preparation step for preparing the intermediary body includes the wire mesh continuous body forming step, the dividing step, and the intermediary body forming step, making it possible to efficiently form the intermediary body.

The porous metal body manufacturing method according to the present invention may further comprise a star-shaped polygonal body compressing step of forming a compressed star-shaped polygonal body by pressing the star-shaped polygonal body formed by the star-shaped polygonal body forming step from an outer side to an inner side in the radial direction, thereby compressing the star-shaped polygonal body toward a center. In the molding step, the compressed star-shaped polygonal body can be inserted into the mold.

According to this invention, the star-shaped polygonal body compressing step is provided between the star-shaped polygonal body forming step and the molding step, making it possible to shorten a length of the protrusions of the star-shaped polygonal body that protrude radially. When the star-shaped polygonal body is compressed, shortening the length of the protrusions, the distribution of the pores that exist inside the protrusions is equalized by the compression of the protrusions. Further, it is possible to compress the star-shaped polygonal body radially inwards on the whole.

A porous metal body according to the present invention for solving the above-described problems is a cylindrical structure obtained by forming a star-shaped polygonal body alternately provided, in a circumferential direction, with a plurality of protrusions protruding radially outward and a plurality of recesses receding radially inward from a ring-shaped wire mesh comprising an inner peripheral surface and an outer peripheral surface and formed by knitting a metal wire, restricting the star-shaped polygonal body on an inner peripheral side and an outer peripheral side, and compressing the star-shaped polygonal body in an axial direction thereof.

According to this invention, the porous metal body is formed after forming the aforementioned star-shaped polygonal body, making it possible to equally distribute the pores between the metal wires in the circumferential direction and equalize the flow rate of the fluid flowing in the axial direction and radial direction of the porous metal body in the circumferential direction of the porous metal body. Further, the star-shaped polygonal body is formed, causing plastic deformation of the wire mesh and making it possible to improve the strength of the completed porous metal body.

In the porous metal body according to the present invention, the tubular wire mesh comprises a plurality of wire mesh layers that overlap in the radial direction.

According to this invention, the tubular wire mesh comprises the plurality of wire mesh layers that overlap in the radial direction, making it possible to improve the strength of the completed porous metal body.

Effect of the Invention

According to the present invention, it is possible to equalize, in a circumferential direction of a porous metal body, a flow rate of a fluid flowing in an axial direction and a radial direction of the porous metal body, and increase a strength of the porous metal body.

EMBODIMENTS OF THE INVENTION

The following describes embodiments of the present invention with reference to the drawings. Note that the technical scope of the present invention is not limited to only the following descriptions and drawings.

[Basic Steps of Porous Metal Body Manufacturing Method]

Figure 1:
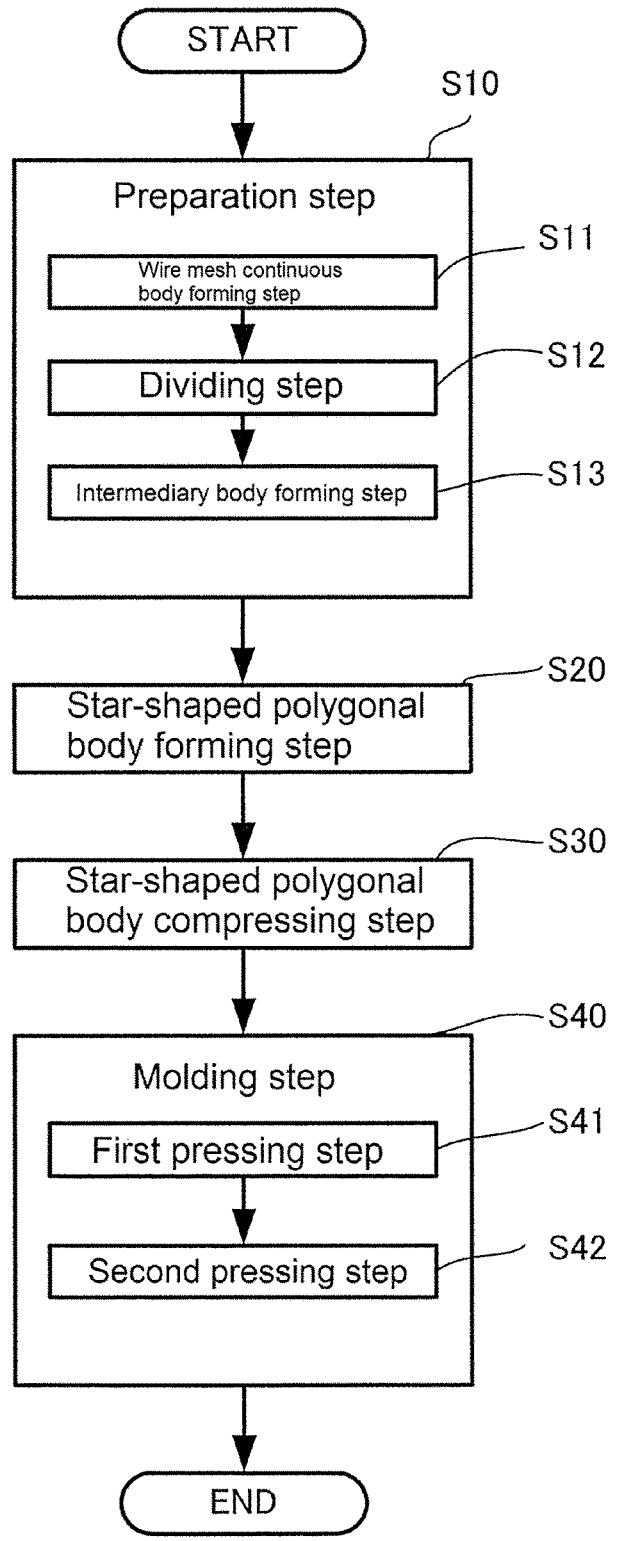
FIG. 1 is a flowchart illustrating one embodiment of a porous metal body manufacturing method according to the present invention.

The manufacturing method of a porous metal body 1 according to the present invention includes a preparation step S10, a star-shaped polygonal body forming step S20, and a molding step S40, as illustrated in FIG. 1. Specifically, the manufacturing method of the porous metal body 1 includes the preparation step S10 of preparing an intermediary body 32 made of a tubular wire mesh, the star-shaped polygonal body forming step S20 of forming a star-shaped polygonal body 60 by alternately forming, in a circumferential direction of the intermediary body 32, a plurality of protrusions 61 protruding radially outward and a plurality of recesses 62 receding radially inward, and the molding step S40 of inserting the star-shaped polygonal body 60 into a mold 80 that restricts an inner peripheral side and an outer peripheral side of the star-shaped polygonal body 60 and compressing the star-shaped polygonal body 60 from one side in an axial direction of the star-shaped polygonal body 60.

The preparation step S10 is a step of knitting a metal wire 10 to form a tubular wire mesh, and forming the tubular intermediary body 32 comprising an inner peripheral portion and an outer peripheral portion from the tubular wire mesh. The star-shaped polygonal body forming step S20 is a step of forming the star-shaped polygonal body 60 by alternately positioning, in the circumferential direction, the plurality of recesses 61 protruding radially outward and the plurality of protrusions 62 receding radially inward, and forming the result into the intermediary body 32. The molding step S40 is a step of inserting the star-shaped polygonal body 60 into a space in the mold 80 configured by a core member 81 that restricts the inner peripheral side of the star-shaped polygonal body 60 and an outer peripheral wall 85 that restricts the outer peripheral side of the star-shaped polygonal body 60, the space being configured by the core member 81 and the outer peripheral wall 85, and compressing the star-shaped polygonal body 60 from one side in the axial direction of the star-shaped polygonal body 60. The mold 80 used in the molding step S40 is configured to be changeable to at least two forms differing in length in the axial direction thereof.

The molding step S40 comprises at least a first pressing step S41 of compressing the star-shaped polygonal body 60 from one side in the axial direction using the mold 80 of a form having a long length in the axial direction and, after the first pressing step S41, a second pressing step S42 of further compressing the star-shaped polygonal body 60 from one side in the axial direction using the mold 80 of a form having a short length in the axial direction.

It should be noted that the preparation step S10 may include a wire mesh continuous body forming step S11, a dividing step S12, and an intermediary body forming step S13. The wire mesh continuous body forming step S11 is a step of forming a tubular wire mesh continuous body 30 continuous in the axial direction by knitting the metal wire 10. The dividing step S12 is a step of dividing the wire mesh continuous body 30 into a plurality of tubular wire mesh bodies 31 having a fixed length in the axial direction thereof. The intermediary body forming step S13 is a step of forming the intermediary body 32 by folding a side wall portion of each of the tubular wire mesh bodies 31 in the axial direction.

Further, the manufacturing method of the porous metal body 1 may further comprise a star-shaped polygonal body compressing step S30 between the aforementioned star-shaped polygonal body forming step S20 and the molding step S40, as necessary. This star-shaped polygonal body compressing step S30 is a step of forming a compressed star-shaped polygonal body 60 by pressing the star-shaped polygonal body 60 formed by the star-shaped polygonal body forming step S20 from an outer side to an inner side in the radial direction, thereby compressing the star-shaped polygonal body 60 toward a center. When this star-shaped polygonal body compressing step S30 is further provided, the compressed star-shaped polygonal body 60 is inserted into the mold 80 in the molding step S40.

According to the manufacturing method of the porous metal body 1 according to the present invention comprising the above steps, a particular effect is achieved in which a flow rate of a fluid flowing in the axial direction and the radial direction of the porous metal body 1 can be equalized in the circumferential direction of the porous metal body 1, and the strength of the porous metal body 1 can be increased.

The following describes the porous metal body 1 manufactured by the manufacturing method of the porous metal body 1 according to the present invention, followed by the details of each step of the manufacturing method of the porous metal body 1.

[Porous Metal Body]

Figure 2:
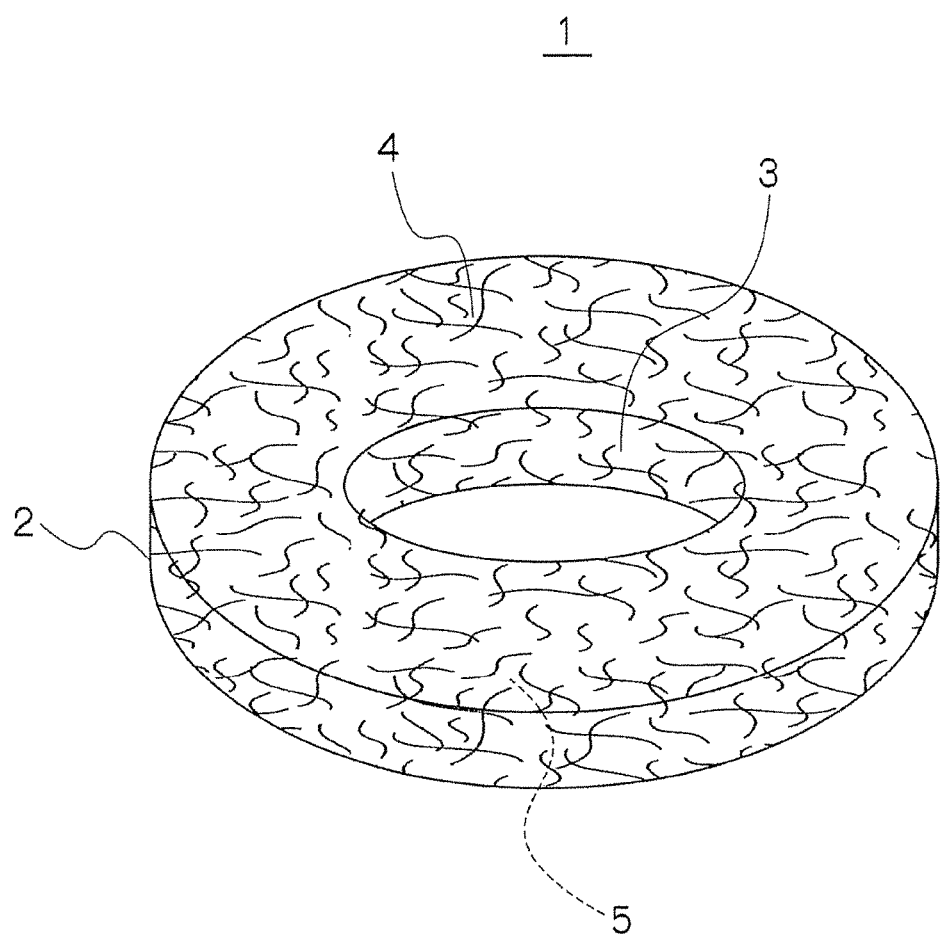
FIG. 2 is a perspective view of a porous metal body of one embodiment manufactured by the porous metal body manufacturing method according to the present invention.

The porous metal body 1, as illustrated in FIG. 2, forms a cylindrical shape and has a cavity in the center in the radial direction. That is, the porous metal body 1 comprises an outer peripheral surface 2, an inner peripheral surface 3, and a pair of end surfaces 4, 5 that form both end portions in the axial direction.

This porous metal body 1 is manufactured by machining a tubular wire mesh formed by knitting the metal wire 10. Specifically, the porous metal body 1 is formed into a cylindrical shape by machining a tubular wire mesh comprising an inner peripheral surface and an outer peripheral surface and formed by knitting the metal wire 10, alternately forming in the circumferential direction the plurality of protrusions 61 protruding radially outward and the plurality of recesses 62 receding radially inward to form the star-shaped polygonal body 60, and compressing the star-shaped polygonal body 60 in the axial direction thereof while restricting the inner peripheral side and the outer peripheral side of this star-shaped polygonal body 60. Further, the ring-shaped wire mesh comprises a plurality of wire mesh layers overlapping in the radial direction.

(Metal Wire)

Examples of the metal wire 10 used include a wire material made of stainless steel or mild steel. Examples of the stainless steel wire material include a wire material made of SUS304 or SUS316 of Japanese Industrial Standards (JIS), or the like. Examples of the mild steel wire material include a wire material made of SWRM6 or SWRCH6A defined by JIS, or the like. When a mild steel wire material is used as the metal wire 10, the material used may be plated with copper, a copper alloy, zinc, nickel, or other plating. However, in addition to the above materials, the metal wire used may also be titan, nickel, aluminum, or other material. The porous metal body 1, being configured by a wire of such material, is heat resistant, chemical resistant, and corrosion resistant.

The metal wire 10 is a wire material having a circular cross-sectional shape. A diameter of the metal wire 10 is from 0.01 mm to 3 mm inclusive. However, the material used for the metal wire 10 may be a wire material rolled so as to form an elliptical or substantially elliptical cross-sectional shape.

(Porous Metal Body)

With the machining of the tubular wire mesh made of the metal wire 10 described above, the porous metal body 1 has a bulk density of from 0.5 g/cm$^3$ to 6.5 g/cm$^3$ inclusive when a stainless steel having a porosity of from 20% to 90% inclusive and a density of from 7.75 g/cm$^3$ to 8.06 g/cm$^3$ inclusive is used. It should be noted that "porosity" is the ratio of the volume of all the gaps in a product to the total volume of the product, which can be expressed as [(Specific gravity of material−Product density)/Specific gravity of material]×100, and "bulk density" is the mass per unit volume obtained by dividing the product weight by the product volume, which can be expressed as Mass per unit volume=Product weight/Product volume.

The above porous metal body 1 can be used as a filter that captures or filters impurities contained in a fluid, a cooling member that decreases a temperature of a fluid, a muffling member that absorbs explosion sounds, a spacer used between members that constitute a structure, or the like. Specifically, the porous metal body 1 can be used as a filter for an inflator of an airbag. When the porous metal body 1 is used as a filter for an inflator of an airbag, the porous metal body 1 captures or filters impurities produced when the airbag is activated. Further, the porous metal body 1 can be made to function as a muffling filter that muffles the explosion sound when the airbag is activated or as an impact absorption filter that absorbs impact or an explosion prevention filter. Such a porous metal body 1 can be used in a system different from an inflator that customarily burns powder to produce gas.

Furthermore, the porous metal body 1 can be used in a heat exchange system. That is, the porous metal body 1 can be incorporated in a passage of a heat exchanging medium used in a heat exchange system, making the porous metal body 1 function as a recycling unit. In this case, the porous metal body 1 disposed between a high temperature side and a low temperature side of the heat exchange system equally transmits heat in a circumferential direction thereof, making it possible to transmit heat with high thermal conductivity.

The porous metal body 1, as described above, can be used in locations such as a location influenced by a high load, a location influenced by a shock load, a high temperature location, or a location with severe temperature changes.

[Porous Metal Body Manufacturing Method]

As described above, the manufacturing method of the porous metal body 1 includes the preparation step S10, the star-shaped polygonal body forming step S20, and the molding step S40, as illustrated in FIG. 1. Further, the manufacturing method of the porous metal body 1 may further comprise the aforementioned star-shaped polygonal body compressing step S30 between the star-shaped polygonal body forming step S20 and the molding step S40, as necessary.

<Preparation Step>

The preparation step S10 is a step of knitting the metal wire 10 to form a tubular wire mesh, and forming the tubular intermediary body 32 comprising an inner peripheral portion and an outer peripheral portion from the tubular wire mesh. This preparation step S10 may include the wire mesh continuous body forming step S11, the dividing step S12, and the intermediary body forming step S13, as illustrated in FIG. 1.

(Wire Mesh Continuous Body Forming Step)

Figure 3:
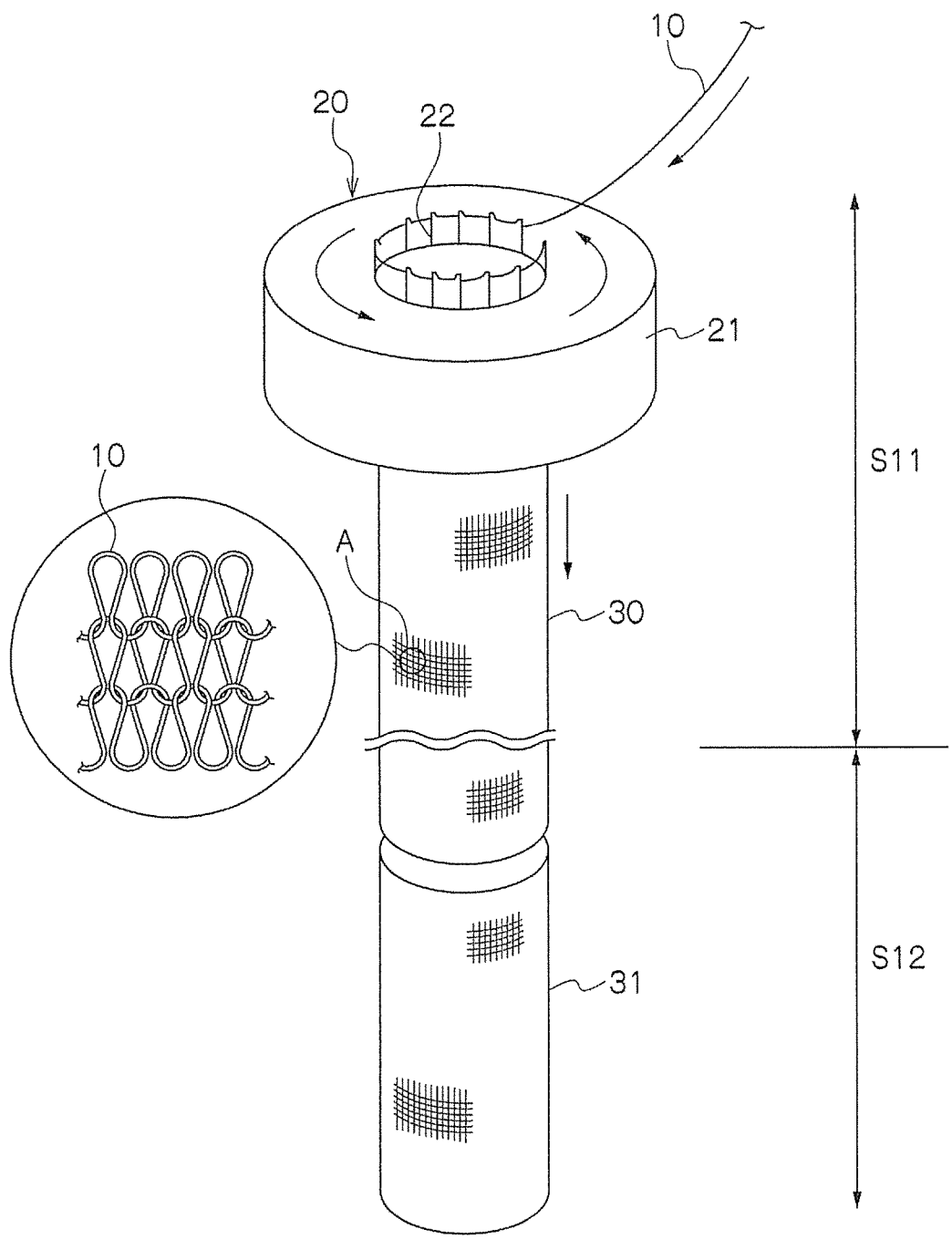
FIG. 3 is an explanatory view for explaining a wire mesh continuous body forming step and a dividing step included in a preparation step.

The wire mesh continuous body forming step S11 is a step of forming a tubular wire mesh continuous body 30 continuous in the axial direction by knitting the metal wire 10. In this wire mesh continuous body forming step S11, as illustrated in FIG. 3, the tubular wire mesh continuous body 30 is formed by feeding the metal wire 10 into a knitting machine 20 and knitting the fed metal wire 10 using the knitting machine 20. It should be noted that FIG. 3 schematically illustrates the knitting machine 20 for ease of explanation.

The knitting machine 20 comprises a main body portion 21 for knitting the metal wire 10, and a guide needle 22 for guiding the fed metal wire 10 into the main body portion 21. The main body portion 21 comprises a hole in the center in the radial direction. The wire mesh continuous body 30 is fed from the hole provided in the main body portion 21.

The wire mesh continuous body 30 forms a cylindrical shape. Further, the wire mesh continuous body 30 continues in the axial direction thereof. Note that the knitting method is not particularly limited. In the example illustrated in FIG. 3, a wire is plain-knitted as illustrated by the enlarged view of section A to form the wire mesh continuous body 30.

(Dividing Step)

Figure 4:
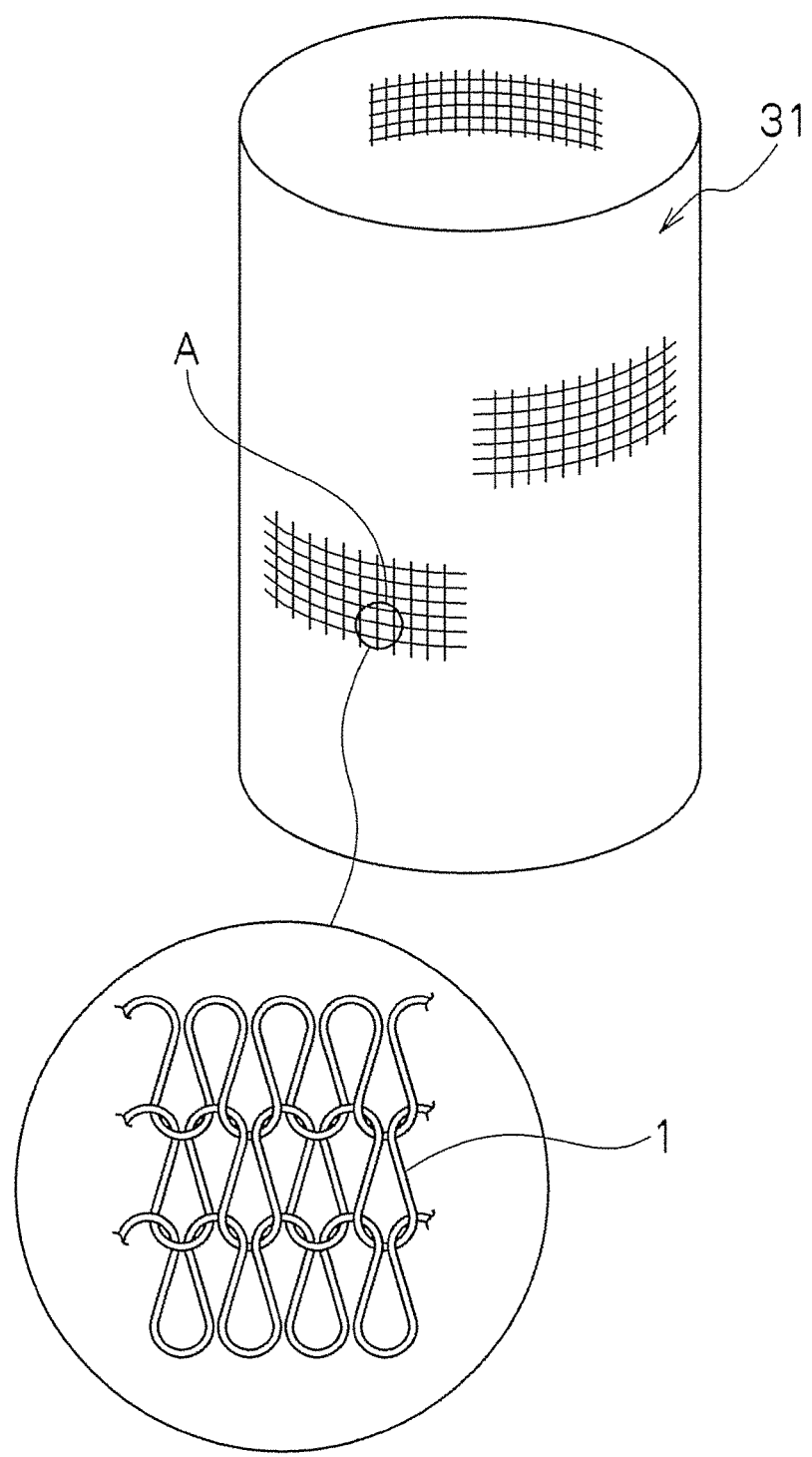
FIG. 4 is a perspective view illustrating an example of a tubular wire mesh body formed in the dividing step.

The dividing step S12, as illustrated in FIG. 3, is a step of dividing the wire mesh continuous body 30 fed from the knitting machine 20 into a plurality of tubular wire mesh bodies 31 having a fixed length in the axial direction thereof. The tubular wire mesh body 31 formed by this dividing step S12 forms a tubular shape, as illustrated in FIG. 4. The interior of the tubular wire mesh body 31 is a cavity. The method for dividing the wire mesh continuous body 30 into the tubular wire mesh bodies 31 is not particularly limited. Examples of the method of division include a method for forming the tubular wire mesh bodies 31 by cutting the wire mesh continuous body 30 fed from the knitting machine 20 at every predetermined length using an edged tool. It should be noted that the tubular wire mesh body 31 is configured by the knitting of the metal wire 10. The knitting method is not particularly limited, as described above. The tubular wire mesh body 31 illustrated in FIG. 4 is configured by plain-knitting a wire as illustrated in the enlarged view of section A.

(Intermediary Body Forming Step)

Figure 5:
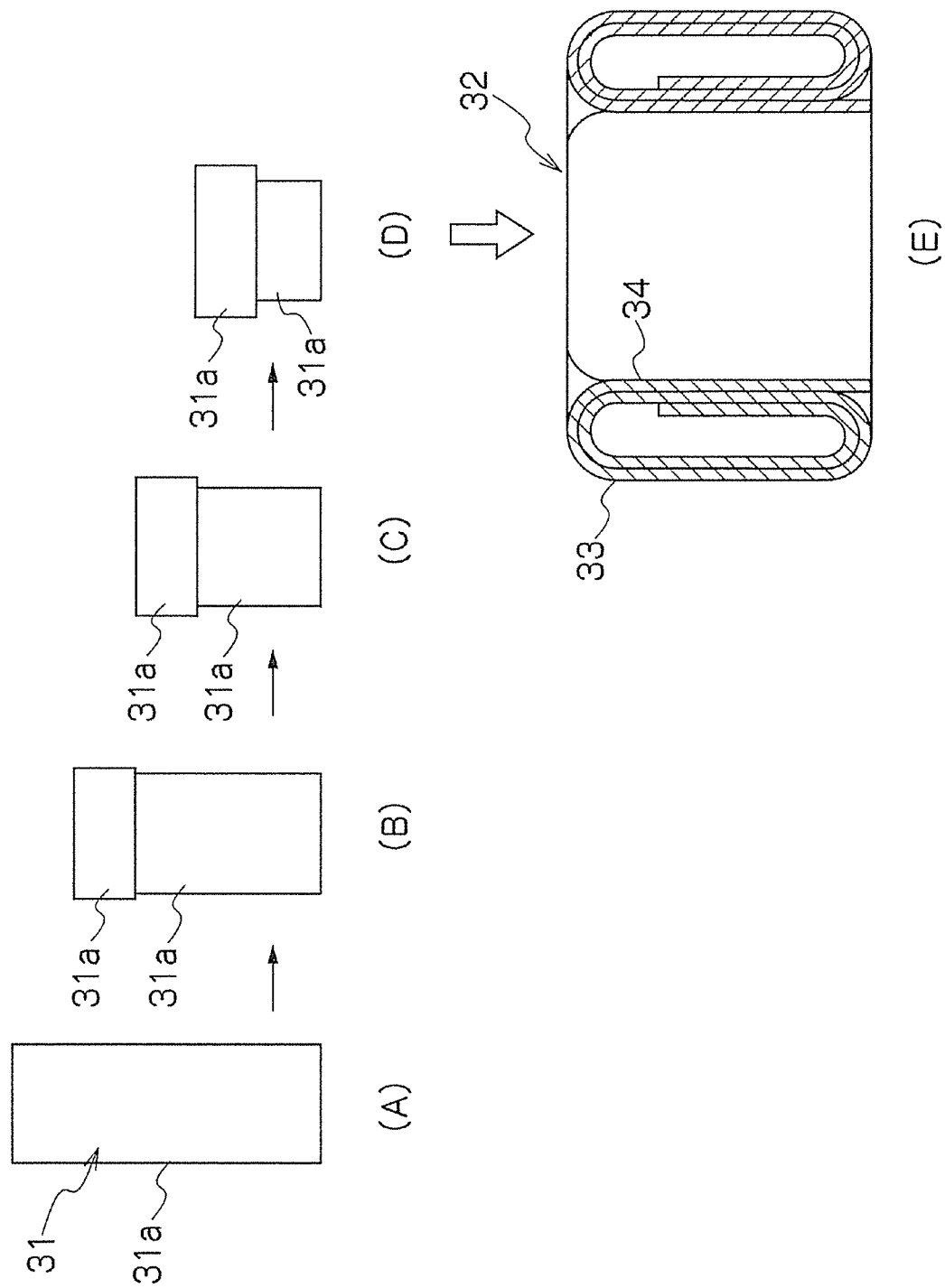
FIGS. 5A to 5E are explanatory views for explaining an intermediary body forming step included in a preparation step.
Figure 6:
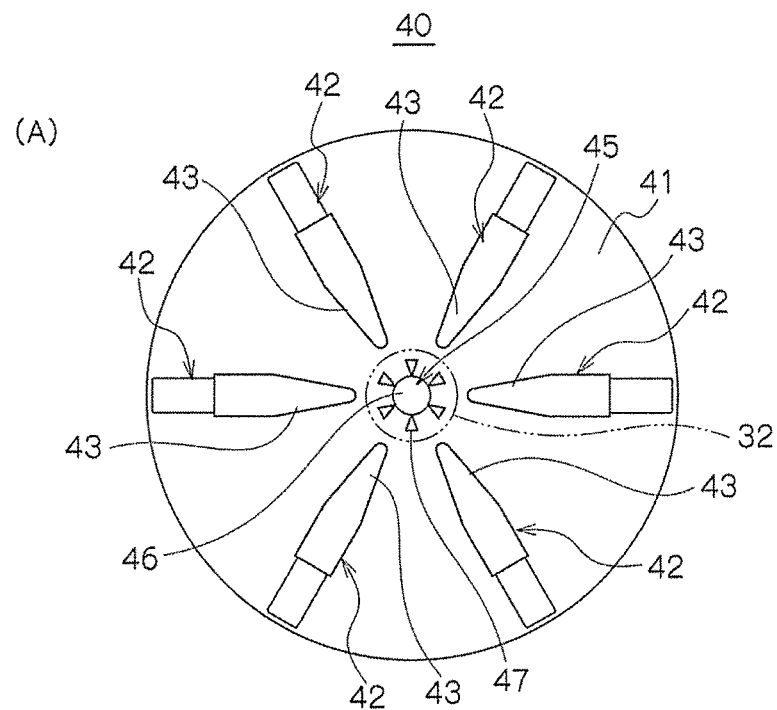
FIGS. 6A and 6B are explanatory views for explaining a star-shaped polygonal body forming step of a first type.
Figure 6:
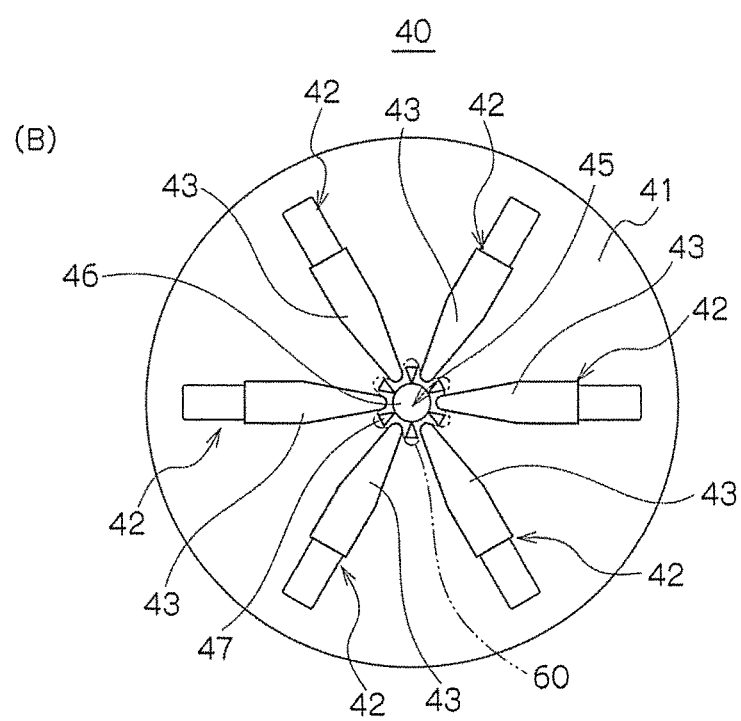

The intermediary body forming step S13 is a step of forming the intermediary body 32 by folding a side wall portion 31a of the tubular wire mesh body 31 in the axial direction, as illustrated in FIGS. 5A to 5E. It should be noted that FIGS. 5A to 5E schematically illustrate the intermediary body forming step S13. In this intermediary body forming step S13, the side wall portion 31a is folded outward a plurality of times at every fixed length in the axial direction from one end in the axial direction of the tubular wire mesh body 31, as illustrated in FIGS. 5A to 5D, thereby forming the intermediary body 32 illustrated in FIG. 5E. However, the intermediary body 32 can also be formed by rolling the side wall portion 31a of the tubular wire mesh body 31 outward from one end in the axial direction of the tubular wire mesh body 31. The intermediary body 32 formed by this intermediary body forming step S13 is a ring-shaped wire mesh and comprises an outer peripheral portion 33 and an inner peripheral portion 34, as illustrated in FIG. 5E. Further, the intermediary body 32 serving as a ring-shaped wire mesh comprises a plurality of wire mesh layers overlapping in the radial direction.

<Star-shaped Polygonal Body Forming Step>

Next, the star-shaped polygonal body forming step S20 of forming the star-shaped polygonal body 60 will be described with reference to FIGS. 6 to 12.

The star-shaped polygonal body forming step S20 is a step of forming the star-shaped polygonal body 60 by alternately positioning, in the circumferential direction, the plurality of protrusions 61 protruding radially outward and the plurality of recesses 62 receding radially inward, and forming the result into the intermediary body 32. This star-shaped polygonal body forming step S20 includes a first type of forming the star-shaped polygonal body 60 using a device 40 illustrated in FIGS. 6A and 6B, and a second type of forming the star-shaped polygonal body 60 using a device 50 illustrated in FIG. 12.

The star-shaped polygonal body forming step S20 of the first type is a step of forming the star-shaped polygonal body 60 by pressing a plurality of tabs 42 that are regularly spaced apart in the circumferential direction and move in the radial direction on this intermediary body 32 from the outer side in the radial direction of the intermediary body 32, as illustrated in FIGS. 6A and 6B. For example, when the star-shaped polygonal body 60 (refer to FIG. 7) comprising six protrusions 61 and six recesses 62 is formed, the star-shaped polygonal body forming step S20 is implemented using the device 40 comprising the six tabs 42 (hereinafter simply referred to as "device 40"). This device 40 comprises, for example, a base 41, the six tabs 42 disposed on the base 41, and a receiving portion 45 disposed on the base 41.

The base 41 forms a disk shape. This base 41 is a member on which the intermediary body 32 formed as the star-shaped polygonal body 60 is placed.

The six tabs 42 are equally disposed in the circumferential direction on the base 41. The tabs 42 are each arranged so that a longitudinal direction thereof is in the radial direction. The tabs 42 each comprise a pressing portion 43 having a tapered shape on one end side in the longitudinal direction thereof. The tabs 42 are each disposed so that the pressing portion 43 faces radially inward.

The receiving portion 45 is an area that receives the intermediary body 32 pressed by the tabs 42 on the inner side of the intermediary body 32. The receiving portion 45 is disposed in the center of the base 41. The receiving portion 45 comprises at least a ring portion 46 and a partitioning portion 47 that extends radially outward from the ring portion 46. The partitioning portion 47 is provided in six locations in the circumferential direction. The spacing in the circumferential direction between each of the partitioning portions 47 is fixed.

The six tabs 42 are positioned between the partitioning portions 47 of the receiving portion 45 in the circumferential direction. When the tabs 42 move radially inward, each of the pressing portions 43 of the tabs 42 is inserted between the partitioning portions 47 of the receiving portion.

This device 40 forms the star-shaped polygonal body 60 as follows. First, as illustrated in FIG. 6A, in the device 40, the six tabs 42 are moved radially outward. The intermediary body 32 is set between the pressing portions 43 provided to each of the tabs 42, and the receiving portion 45. Once the intermediary body 32 has been set in the device 40, the tabs 42 are moved radially inward, and the pressing portions 43 are thrust against the outer peripheral portion of the intermediary body 32, pressing the intermediary body 32 from the outer side toward the inner side in the radial direction, as illustrated in FIG. 6B.

The device 40 presses the six tabs 42 on the intermediary body 32, thereby forming the recess 62 receding from the outer side toward the inner side in the radial direction in six locations in the circumferential direction of the intermediary body 32. On the other hand, the device 40 forms sections between the sections where the tabs 42 were pressed as the protrusions 61 protruding radially outward. As a result, the device 40 forms the star-shaped polygonal body 60 illustrated in FIG. 7.

Figure 7:
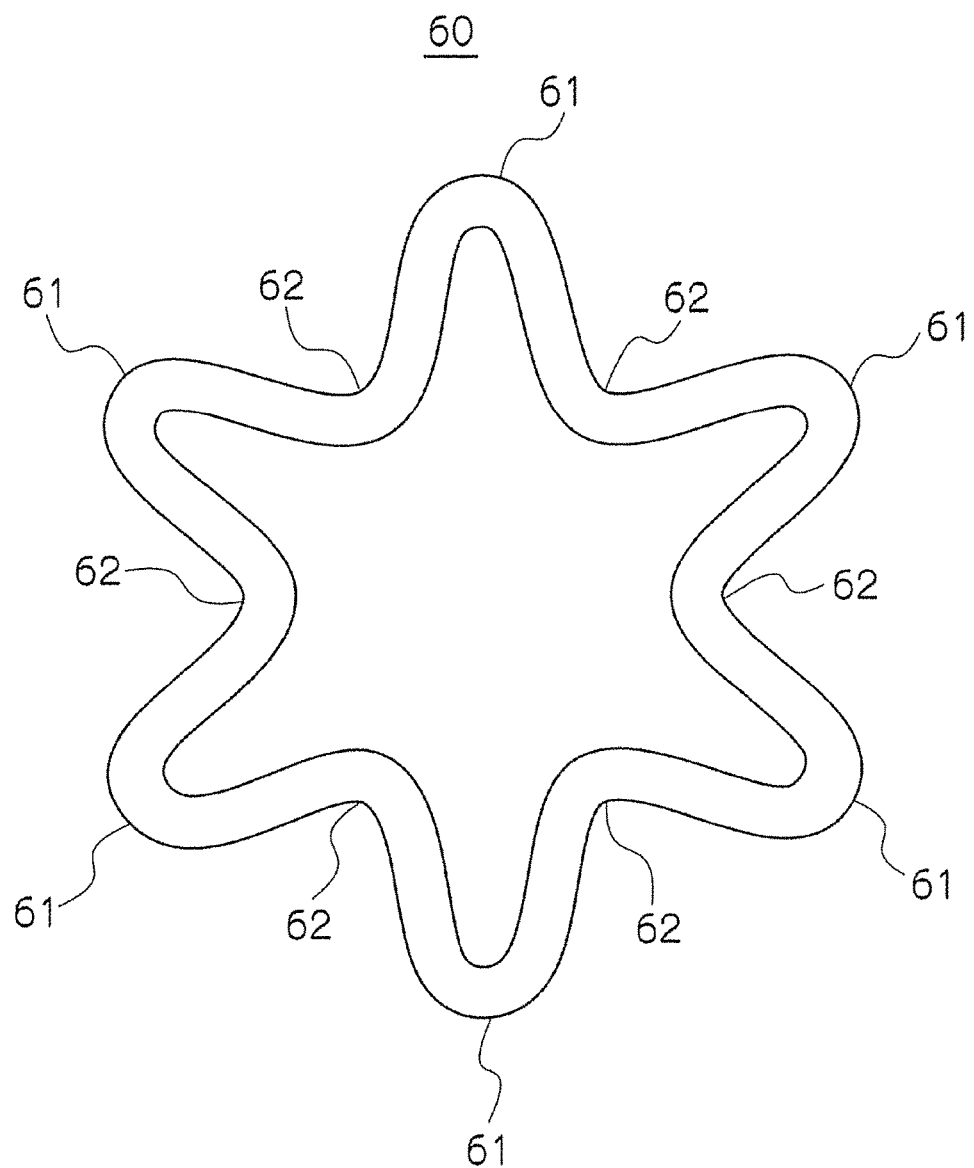
FIG. 7 is a plan view illustrating an example of a star-shaped polygonal body.

FIG. 7 illustrates an example of the star-shaped polygonal body 60. This star-shaped polygonal body 60 comprises the protrusions 61 protruding radially outward in six locations in the circumferential direction. Further, the star-shaped polygonal body 60 comprises the recesses 62 receding radially inward between the protrusions 61. This recess 62 is an area formed by the pressing of the pressing portion 43 of the tab 42 as described above.

It should be noted that the star-shaped polygonal body 60 formed in the star-shaped polygonal body forming step S20 is not limited to the shape comprising six protrusions 61 and six recesses 62. The number of the protrusions 61 and the number of the recesses 62 may be five or less or seven or more. In such a case, the number of tabs 42 provided to the device is matched to the number of the recesses 62 and the number of the protrusions 61 of the star-shaped polygonal body 60 to be formed. For example, when a star-shaped polygonal body 60 having eight recesses 62 and eight protrusions 61 is to be formed, eight tabs 42 are provided to the device.

In the star-shaped polygonal body forming step S20 of the first type, it is possible to form the recesses 62 receding radially inward in a plurality of sections where the tabs 42 were pressed, and form the protrusions 61 protruding radially outward in a plurality of sections between the sections where the tabs 42 were pressed. This makes it possible to efficiently form the star-shaped polygonal body 60 by pressing the plurality of tabs 42 on the intermediary body 32 all at once.

Figure 8:
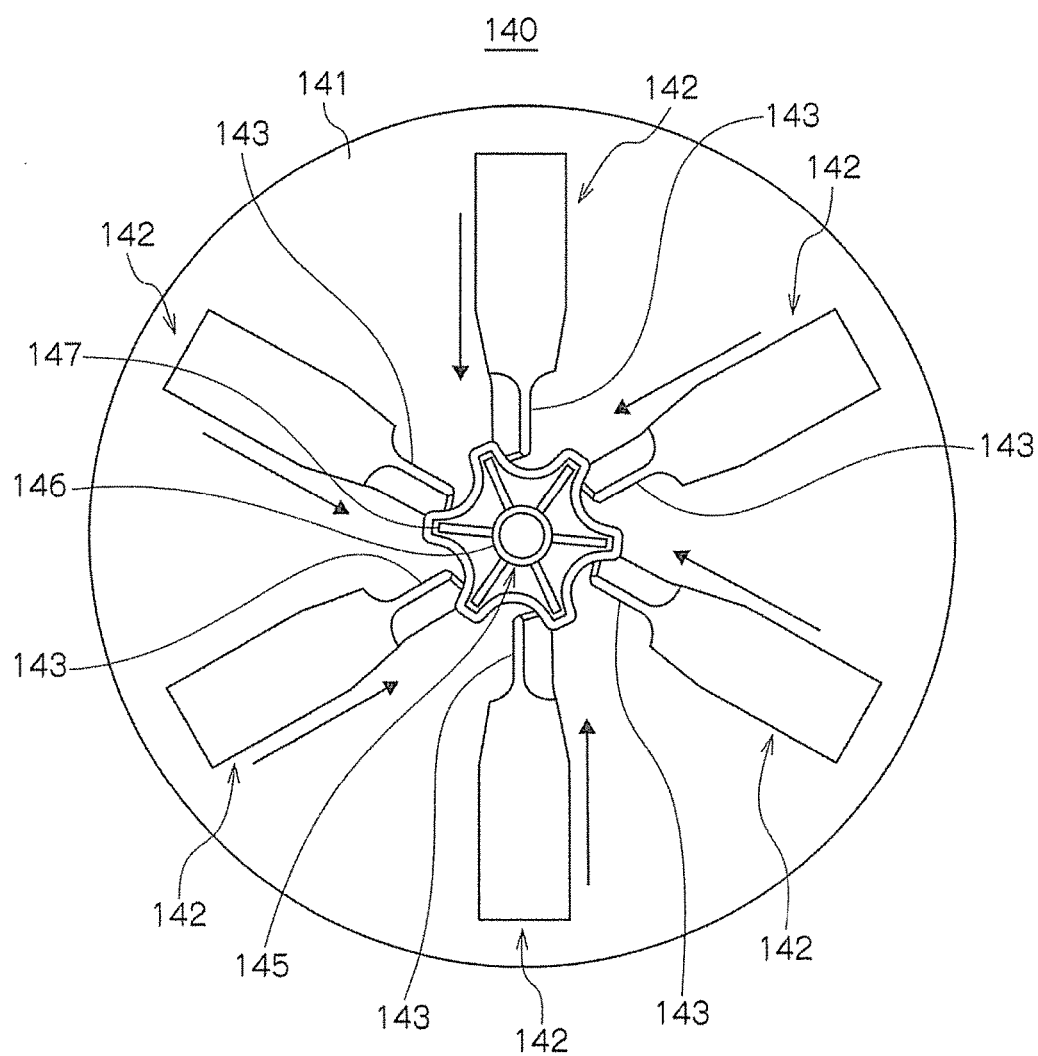
FIG. 8 is an explanatory view for explaining the star-shaped polygonal body forming step of the first type of a form different from that of the star-shaped polygonal body forming step illustrated in FIGS. 6A and 6B.

In the star-shaped polygonal body forming step S20 of the first type, a star-shaped polygonal body 160 illustrated in FIG. 10 may be formed from the intermediary body 32 using a device 140 illustrated in FIG. 8 (hereinafter referred to as "device 140").

This device 140 comprises, for example, a base 141, six tabs 142 disposed on the base 141, and a receiving portion 145 disposed on the base 141. The base 141 forms a disk shape, for example. This base 141 is a member on which the intermediary body 32 formed as the star-shaped polygonal body 160 is placed. The six tabs 142 are equally disposed in the circumferential direction on the base 141 so that the longitudinal direction thereof is in the radial direction of the base. The tabs 142 each comprise a flat-plate shaped pressing portion 143 on one end side in the longitudinal direction thereof, and this pressing portion 143 faces radially inward.

Figure 9:
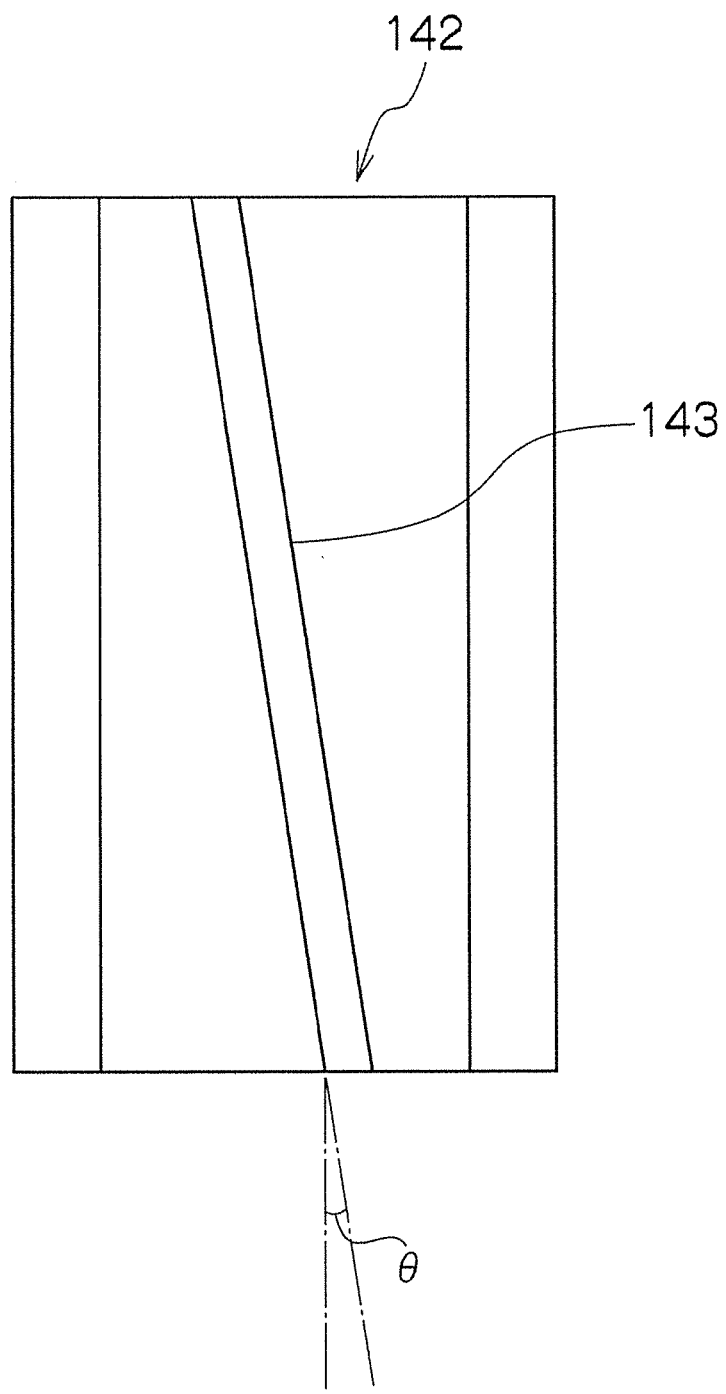
FIG. 9 is an explanatory view for explaining a pressing portion that constitutes a tab of the device illustrated in FIG. 8.

The pressing portion 143, as illustrated in FIG. 9, is diagonally inclined with respect to a vertical direction. It should be noted that the vertical direction matches the axial direction of the intermediary body 32 and the axial direction of the star-shaped polygonal body 160. An inclination angle $\theta$ with respect to the vertical direction of the pressing portion 143 may be set as appropriate in accordance with a length in the axial direction of the intermediary body 32, within a range of from 5 degrees to 85 degrees inclusive. That is, when the star-shaped polygonal body 160 is formed this inclination angle $\theta$ is set so that protrusions 161 exist in another region in the axial direction and recesses 162 exist in one region in the axial direction in a section in the circumferential direction.

The receiving portion 145 is an area that is disposed in the center of the base 141 and receives the intermediary body 32 pressed by the tabs 142 on the inner side of the intermediary body 32. The structure of the receiving portion 145 is substantially the same as that of the receiving portion 45 of the device 40 illustrated in FIGS. 6A and 6B, and comprises at least a ring portion 146 and a partitioning portion 147 that extends radially outward from the ring portion 146.

Figure 10:
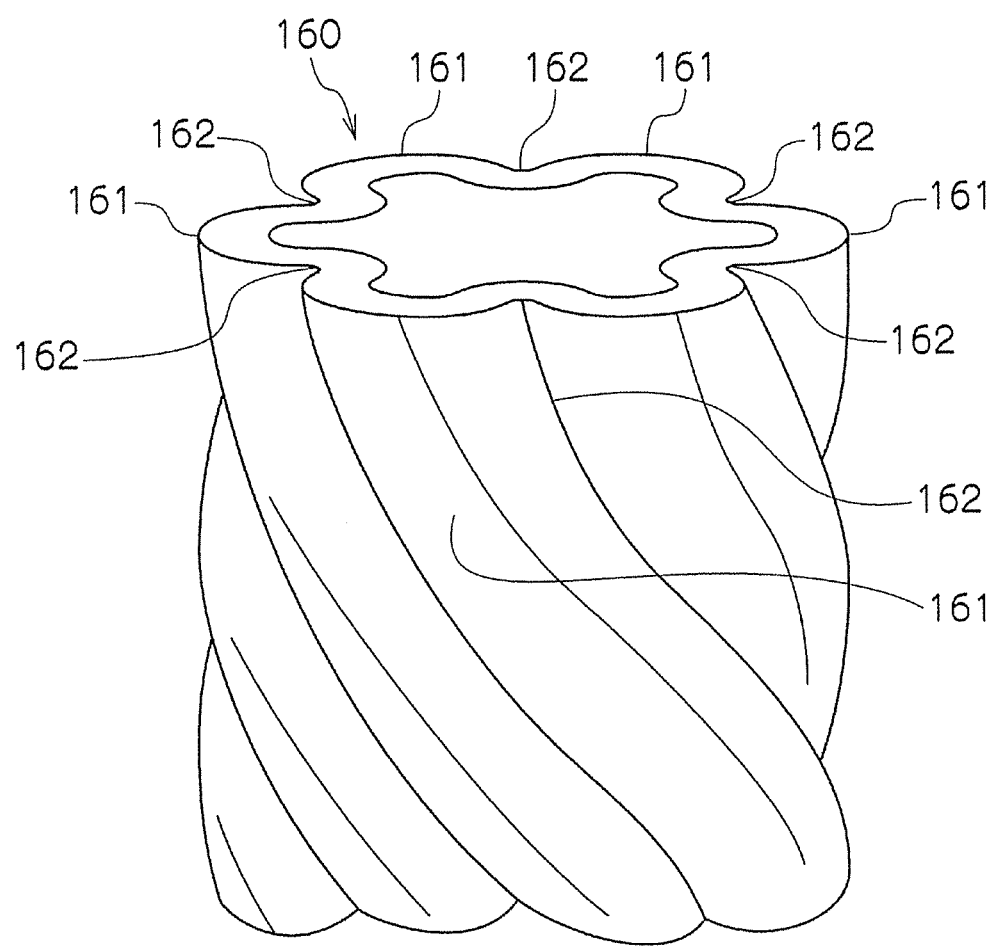
FIG. 10 is a perspective view illustrating an example of the star-shaped polygonal body of a form different from that of the star-shaped polygonal body illustrated in FIG. 7.

This device 140 forms the star-shaped polygonal body illustrated in FIG. 10 by thrusting the pressing portions 143 against the outer peripheral portion of the intermediary body 32 from the outer side in the radial direction of the intermediary body 32, and pressing the intermediary body 32 from the outer side toward the inner side in the radial direction. Specifically, the device 140 forms recesses 162 in the positions where the pressing portions 143 of the tabs 142 were pressed and protrusions 161 in positions between the pressing portions 143 of the tabs 142, thereby forming the star-shaped polygonal body 160.

FIG. 10 illustrates an example of the star-shaped polygonal body 160 formed by the device 140. This star-shaped polygonal body 160 comprises the protrusions 161 protruding radially outward in six locations in the circumferential direction. Further, the star-shaped polygonal body 160 comprises the recesses 162 receding radially inward between the protrusions 161.

The protrusions 161 and the recesses 162 each incline diagonally with respect to the axial direction of the star-shaped polygonal body 160. As a result, in a section in the circumferential direction, protrusions 161 exist in another region in the axial direction and recesses 162 exist in one region in the axial direction. Thus, when the star-shaped polygonal body 160 is viewed in the plan view, the density in the circumferential direction is equalized. As a result, the porous metal body 1 formed from the star-shaped polygonal body 160 makes it possible to equalize the pressure loss of the fluid flowing in the interior of this porous metal body 1 in the circumferential direction, and equalize the strength in the circumferential direction.

The above has described a case where the star-shaped polygonal body 160 is formed using the tabs 142 comprising the diagonally inclined pressing portions 143. However, the star-shaped polygonal body 160 in which the protrusions 161 and the recesses 162 are diagonally inclined with respect to the axial direction may be formed by first forming the star-shaped polygonal body 60 illustrated in FIG. 7 using the device 40 illustrated in FIGS. 6A and 6B, and then twisting the star-shaped polygonal body 60 in the circumferential direction.

Figure 11:
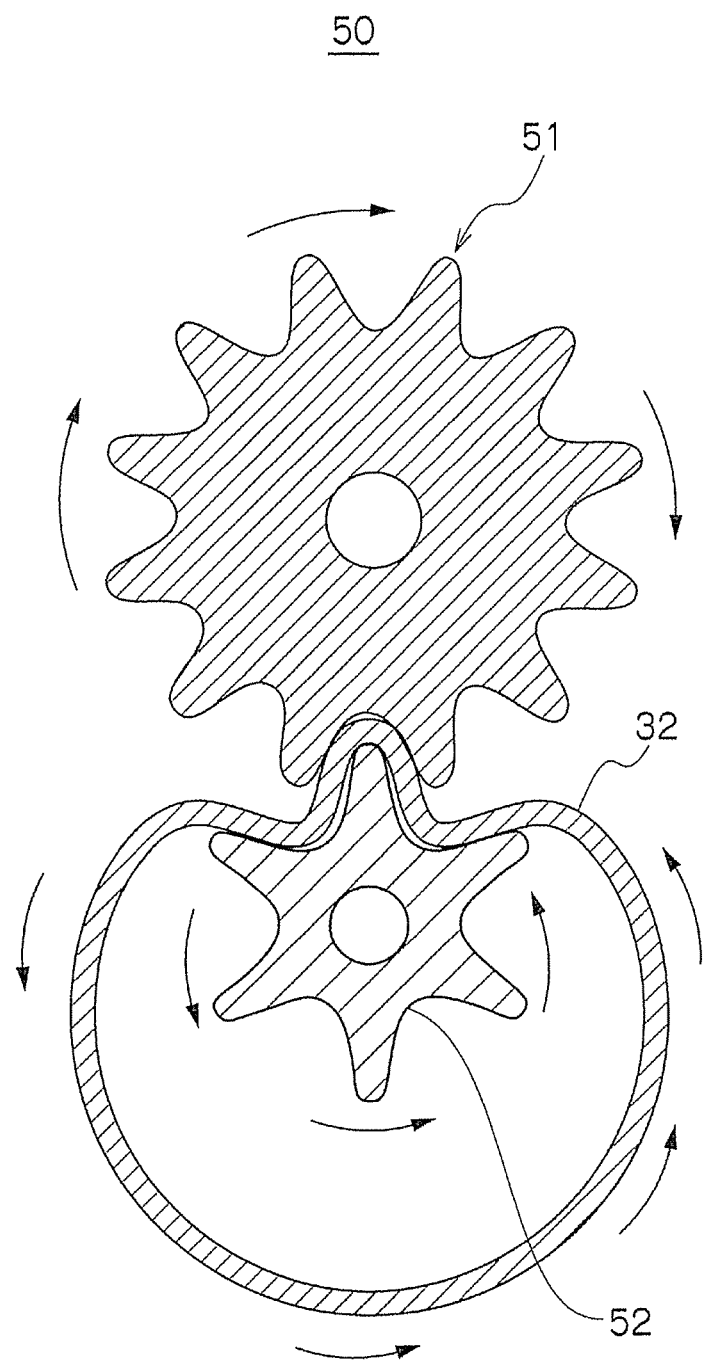
FIG. 11 is an explanatory view for explaining the star-shaped polygonal body forming step of a second type.

The star-shaped polygonal body forming step S20 of the second type, as illustrated in FIG. 11, is a step of forming the star-shaped polygonal body 60 by engaging a first gear 51 disposed on the outer side of the intermediary body 32 and a second gear 52 disposed on an inner side of the intermediary body 32 while moving the intermediary body 32 in the circumferential direction.

The device 50 used in the star-shaped polygonal body forming step S20 of the second type (hereinafter simply referred to as "device 50") comprises the two gears 51, 52, as illustrated in FIG. 11. It should be noted that FIG. 11 schematically illustrates an example of the device 50. The device 50 illustrated in FIG. 11 comprises the first gear 51 having a blade edge circle with a relatively large diameter, and the second gear 52 having a blade edge circle with a relatively small diameter. The first gear 51 is disposed on the outer side of the intermediary body 32, and the second gear 52 is disposed on the inner side of the intermediary body 32.

This device 50 is configured so that a distance between the first gear 51 and the second gear 52 can be lengthened and shortened. However, even in a case where the distance between the first gear 51 and the second gear 52 is shortened to the maximum extent, a fixed gap is formed between the first gear 51 and the second gear 52 without the teeth of the first gear 51 and the teeth of the second gear 52 coming into contact. That is, when a tooth of the first gear 51 is positioned between two teeth of the second gear 52, a fixed gap is formed between a tooth tip of the first gear 51 and a tooth base of the second gear 52. Further, a fixed gap is also formed between a tooth surface of the first gear 51 and a tooth surface of the second gear 52. Similarly, when a tooth of the second gear 52 is positioned between two teeth of the first gear, a fixed gap is formed between the tooth tip of the second gear 52 and the tooth base of the first gear 51, and a fixed gap is also formed between the tooth surface of the first gear 51 and the tooth surface of the second gear 52.

In the star-shaped polygonal body forming step S20 of the second type, the star-shaped polygonal body 60 is formed as follows by the device 50.

First, with the first gear 51 and the second gear 52 separated (not illustrated), the intermediary body 32 is set between the first gear 51 and the second gear 52. At this time, the second gear 52 is positioned on the inner side of the intermediary body 32.

Next, the first gear 51 and the second gear 52 are made to come into contact with each other, and the intermediary body 32 is sandwiched by the first gear 51 and the second gear 52. With the intermediary body 32 sandwiched between the first gear 51 and the second gear 52, the side wall portion of the intermediary body 32 is pressed toward the tooth base of the second gear 52 by the tooth tips of the first gear 51, and pressed toward the tooth base of the first gear 51 by the tooth tip of the second gear 52. As a result, the protrusions 61 protruding radially outward and the recesses 62 receding radially inward with respect to the intermediary body 32 are formed on the intermediary body 32, as illustrated in FIG. 11.

Subsequently, the first gear 51 and the second gear 52 are rotated, and the intermediary body 32 is moved in the circumferential direction. In the device 50, because the first gear 51 and the second gear 52 sandwich the intermediary body 32, the first gear 51 and the second gear 52 move the intermediary body 32 in the circumferential direction with the rotation thereof, alternately forming the protrusions 61 and the recesses 62 across a wide range in the circumferential direction of the intermediary body 32. Specifically, the recesses 62 are formed in positions of the intermediary body corresponding to the tooth ridges of the first gear 51, and the protrusions 61 are formed in positions of the intermediary body corresponding to the tooth ridges of the second gear 52, thereby forming the star-shaped polygonal body 60. It should be noted that, in the star-shaped polygonal body 60 formed by the device 50 illustrated in FIG. 11, the protrusions 61 protruding radially outward and the recesses 62 receding radially inward are each formed in six locations in the circumferential direction, as illustrated in FIG. 7.

In the star-shaped polygonal body forming step S20 of the second type, the star-shaped polygonal body 60 can be formed by simply engaging the two gears 51, 52. This makes it possible to form the star-shaped polygonal body 60 using a simple device. Further, a star-shaped polygonal body 60 having a different number of recesses 62 and protrusions 61 can be formed by simply replacing the gears with those having a different number of teeth.

Figure 12:
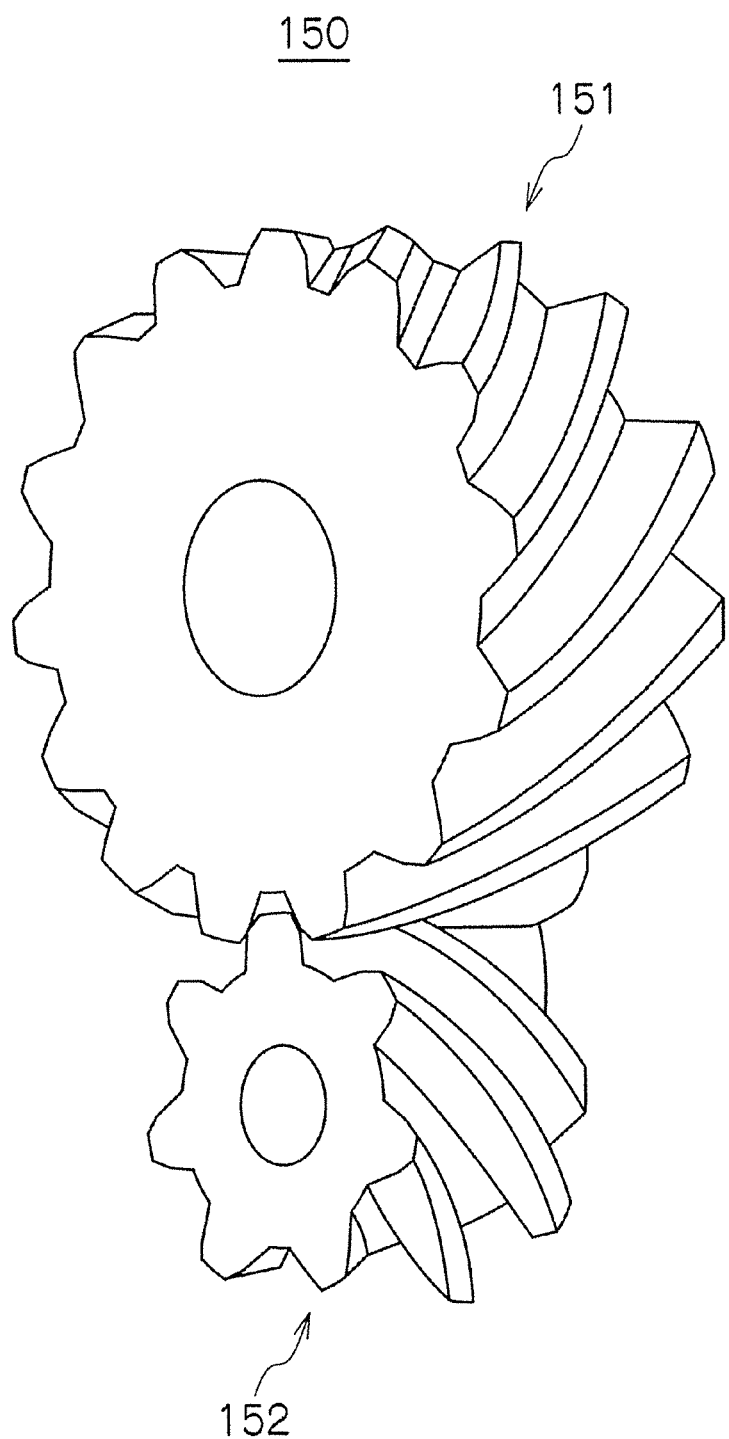
FIG. 12 is a perspective view illustrating a helical gear of a device that uses a helical gear, used in the star-shaped polygonal body forming step of the second type.

In the star-shaped polygonal body forming step S20 of the second type, the star-shaped polygonal body 160 may be formed by engaging two helical gears 151, 152 while moving the intermediary body 32 in the circumferential direction, as illustrated in FIG. 12.

A device 150 used in this star-shaped polygonal body forming step S20 (hereinafter simply referred to as "device 150") comprises the two gears 151, 152, as illustrated in FIG. 12. The two gears 151, 152 are helical gears in which the tooth ridges are diagonally inclined with respect to the circumferential direction of each gear. The device 150 illustrated in FIG. 12 comprises the first gear 151 having a blade edge circle with a relatively large diameter, and the second gear 152 having a blade edge circle with a relatively small diameter. The first gear 151 is disposed on the outer side of the intermediary body (not illustrated), and the second gear 152 is disposed on the inner side of the intermediary body (not illustrated).

The device 150 sandwiches the intermediary body between the first gear 151 and the second gear 152, and rotates the first gear 151 and the second gear 152, thereby moving the intermediary body (not illustrated) in the circumferential direction and forming the star-shaped polygonal body 160 comprising the diagonally inclined protrusions 161 and recesses 162 (refer to FIG. 10). Specifically, the recesses 162 are formed in positions of the intermediary body corresponding to the tooth ridges of the first gear 151, and the protrusions 161 are formed in positions of the intermediary body corresponding to the tooth ridges of the second gear 152, thereby forming the star-shaped polygonal body 160.

It should be noted that, when the star-shaped polygonal body 160 is formed by the star-shaped polygonal body forming step S20 of the second type, the star-shaped polygonal body 160 may be formed by first forming the star-shaped polygonal body 60 illustrated in FIG. 7 using the device 50 illustrated in FIG. 11 and then twisting the star-shaped polygonal body 60 in the circumferential direction.

<Star-shaped Polygonal Body Compressing Step>

Next, the star-shaped polygonal body compressing step S30 will be described with reference to FIG. 13. It should be noted that the star-shaped polygonal body compressing step S30 is a step provided as necessary, and is not required.

The star-shaped polygonal body compressing step S30 is a step of forming the compressed star-shaped polygonal bodies 60, 160 by compressing the star-shaped polygonal body 60 formed by the star-shaped polygonal body forming step S20 from the outer side toward the inner side in the radial direction. In this star-shaped polygonal body compressing step S30, a device 70 illustrated in FIG. 13 (hereinafter simply referred to as "device 70") is used, for example. The following describes a case where the compressed star-shaped polygonal body 60 is formed as an example.

This device 70 comprises a circular base 75 and four arms 71 disposed on the base 75. The arms 71 are each disposed so that a longitudinal direction thereof is in the direction extending radially outward from a center of the base 75. Two of the four arms 71 are arranged on a line L1 that forms a diameter of the base 75, and are symmetrical with respect to a center of the base 75. The remaining two arms 71 are disposed on a line L2 orthogonal to the line L1 that forms the diameter. The two arms 71 are also symmetrical with respect to the center of the base 75.

Each of the arms 71 comprises a pressing surface 72 on one end in the longitudinal direction. The pressing surface 72 recedes into an arc shape. The pressing surface 72 is a section that presses on an outer peripheral surface of the star-shaped polygonal body 60. The arms 71 are each disposed with this pressing surface 72 facing the center of the base 75. Then, the four arms 71 are configured to move in the radial direction.

Figure 13:
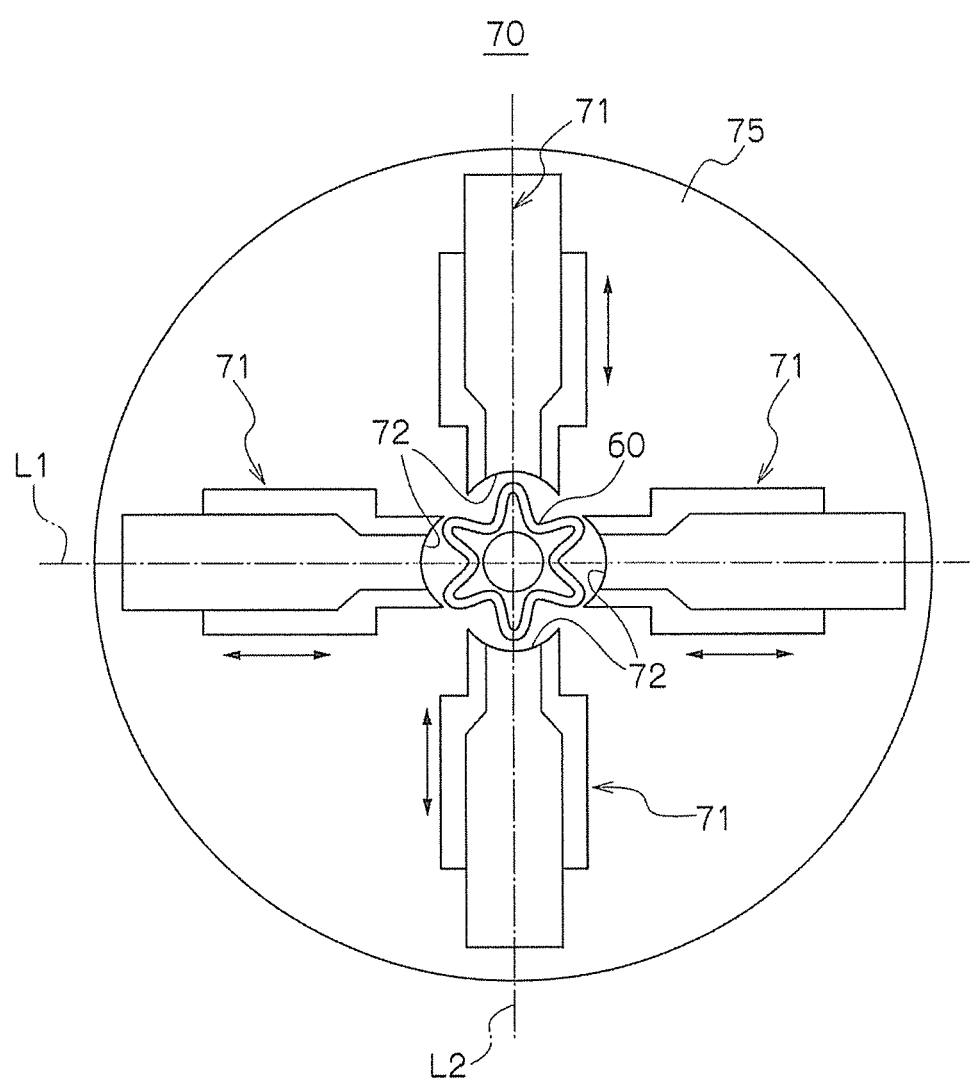
FIG. 13 is an explanatory view for explaining a star-shaped polygonal body compressing step.

In this star-shaped polygonal body compressing step S30, the star-shaped polygonal body 60 is set in the center of the base 75, and the four arms 71 are moved toward the center of the base 75, pressing each of the pressing surfaces 72 on an outer peripheral portion of the star-shaped polygonal body 60, thereby radially compressing the star-shaped polygonal body 60 radially inward, as illustrated in FIG. 13. The compressed star-shaped polygonal body 60 is formed by the star-shaped polygonal body 60 being compressed radially inward by the arms 71.

This star-shaped polygonal body forming step S20 makes it possible to equally distribute the space that exists in the interior of the intermediary body 32. As a result, the space that exists in the interior of the completed porous metal body 1 can be equalized in the circumferential direction. Further, this step causes plastic deformation of the wire mesh that constitutes the intermediary body 32. This makes it possible to increase the strength.

<Molding Step>

In the molding step S40, the mold 80 configured by the core member 81 that restricts the inner peripheral side of the star-shaped polygonal bodies 60, 160 (including the compressed star-shaped polygonal bodies 60, 160) and the outer peripheral wall 85 that restricts the outer peripheral side of the star-shaped polygonal bodies 60, 160 is used. The molding step S40 is a step of molding the porous metal body 1 illustrated in FIG. 2 by inserting the star-shaped polygonal bodies 60, 160 into the space between the core member 81 and the outer peripheral wall 85, and compressing the star-shaped polygonal bodies 60, 160 from one side in the axial direction of the star-shaped polygonal bodies 60, 160. The following describes a case where the star-shaped polygonal body 60 is molded as an example.

The mold 80 used in the molding step S40 is configured to be changeable to at least two forms differing in length in the axial direction thereof, as illustrated in FIGS. 14A to 14D. Then, the molding step S40 comprises at least the first pressing step S41 of compressing the star-shaped polygonal body 60 from one side in the axial direction using the mold 80 of the form having a long length in the axial direction and, after the first pressing step S41, the second pressing step S42 of further compressing the star-shaped polygonal body 60 from one side in the axial direction using the mold 80 of the form having a short length in the axial direction (refer to FIG. 1).

(Configuration of Mold)

The mold 80 comprises the core member 81 and the outer peripheral wall 85, as illustrated in FIGS. 14A to 14D. This mold 80 has a space between the core member 81 and the outer peripheral wall 85 where the star-shaped polygonal body 60 to be molded is inserted. A first end 80a side in the longitudinal direction of the mold 80 is open, and a second end 80b side in the longitudinal direction of the mold 80 is closed by a block 90 or the like. In this molding step S40, an actuator (not illustrated) is provided only on the first end 80a side in the longitudinal direction of the mold 80. In the molding step S40, the actuator provided only on the first end 80a side presses the star-shaped polygonal body 60 inside the mold 80 to form the porous metal body 1.

Figure 14:
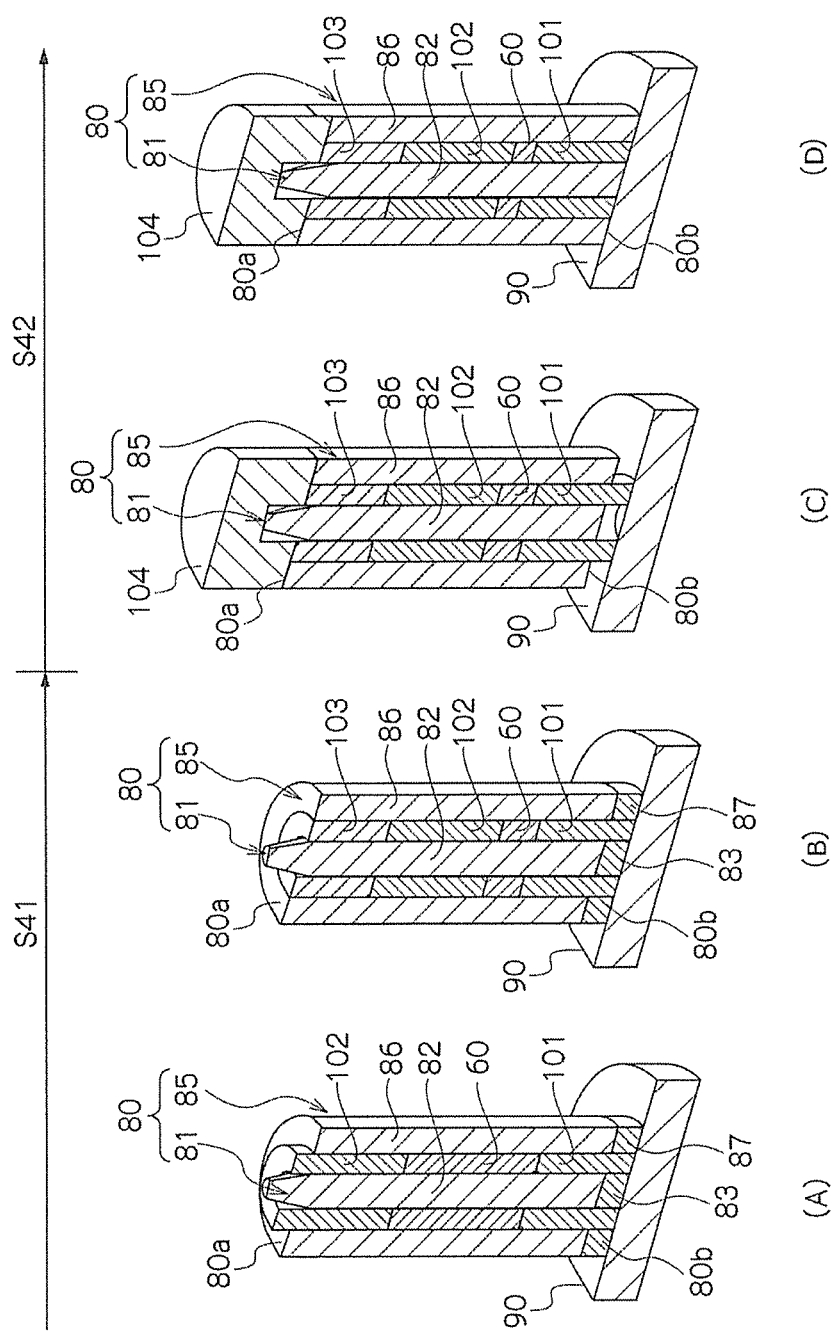
FIGS. 14A to 14D are explanatory views for explaining a molding step.

The core member 81 that constitutes the mold 80 is configured so as to be changeable to two forms of the form having a long length in the axial direction and the form having a short length in the axial direction. Specifically, the core member 81 comprises a core member main body portion 82 and a core member adjusting portion 83 for changing the length in the longitudinal direction of the mold 80. The core member 81 of the long form is a form in which the core member main body portion 82 and the core member adjusting portion 83 are connected in the longitudinal direction of the mold 80, as illustrated in FIGS. 14A and 14B. The core member 81 of the short form is a form in which the core member adjusting portion 83 is removed from the core member 81, as illustrated in FIGS. 14C and 14D.

The outer peripheral wall 85 that constitutes the mold 80 is configured so as to be changeable to two forms of the form having a long length in the axial direction and the form having a short length in the axial direction, in the same way as the core member 81. The outer peripheral wall 85 comprises an outer peripheral wall main body portion 86 and an outer peripheral wall adjusting portion 87. The outer peripheral wall 85 of the long form is a form in which the outer peripheral wall main body portion 86 and the outer peripheral wall adjusting portion 87 are connected in the longitudinal direction of the mold 80, as illustrated in FIGS. 14A and 14B. The outer peripheral wall 85 of the short form is a form in which the outer peripheral wall adjusting portion 87 is removed from the outer peripheral wall 85, as illustrated in FIGS. 14C and 14D.

(Details of Molding Step)

The details of the molding step S40 will now be described with reference to FIGS. 14A to 14D. In this molding step S40, the first pressing step S41 illustrated in FIGS. 14A and 14B is performed, followed by the second pressing step S42 illustrated in FIGS. 14C and 14D.

In the first pressing step S41, first the core member main body portion 82 and the core member adjusting portion 83 are connected in the axial direction, and the outer peripheral wall main body portion 86 and the outer peripheral wall adjusting portion 87 are connected in the axial direction, thereby forming the mold 80 having the long form, as illustrated in FIG. 14A. Further, the first end 80a side in the axial direction of the mold 80 is open while the second end 80b in the axial direction of the mold 80 is closed by the block 90. A first auxiliary member 101, the star-shaped polygonal body 60, and a second auxiliary member 102 are inserted, in that order, into the interior of the mold 80 having this form. That is, as viewed from the second end 80b side of the mold 80, the first auxiliary member 101, the star-shaped polygonal body 60, and the second auxiliary member 102 are disposed, in that order, in the interior of the mold 80.

Next, the actuator (not illustrated) presses the star-shaped polygonal body 60 by pressing the first auxiliary member 101, the star-shaped polygonal body 60, and the second auxiliary member 102 in the interior of the mold 80 from the first end 80a side in the axial direction of the mold 80 toward the block 90.

Next, a third auxiliary member 103 is inserted into the interior of the mold 80 from the first end 80a side in the axial direction of the mold 80, and is disposed on the second auxiliary member 102, as illustrated in FIG. 14B. Next, the actuator (not illustrated) further presses the star-shaped polygonal body 60 by pressing the first auxiliary member 101, the star-shaped polygonal body 60, the second auxiliary member 102, and the third auxiliary member 103 in the interior of the mold 80 from the first end 80a side in the axial direction of the mold 80 toward the block 90.

Next, the second pressing step S42 is performed. In the second pressing step S42, first the core member adjusting portion 83 and the outer peripheral wall adjusting portion 87 are removed from the mold 80, as illustrated in FIG. 14C. As a result, the mold 80 is in the short form made of the core member main body portion 82 and the outer peripheral wall main body portion 86. With the core member adjusting portion 83 and the outer peripheral wall adjusting portion 87 removed from the mold 80, the first auxiliary member 101 protrudes from the mold 80 on the second end 80b side in the axial direction of the mold 80 where the block 90 is disposed.

Further, a pressing jig 104 is made to cover the first end 80a side in the axial direction of the mold 80, as illustrated in FIG. 14C. A lower end surface surrounding this pressing jig 104 is thrust against an end surface on the first end 80a side of the mold 80, and a tip end of the core member 81 is inserted into the interior in a center of the pressing jig 104.

Next, as illustrated in FIG. 14D, the actuator (not illustrated) presses the mold 80 from the first end 80a side in the axial direction of the mold 80, from above the pressing jig 104 toward the block 90. The mold 80 is pressed toward the block 90, thereby pressing the star-shaped polygonal body 60.

When the star-shaped polygonal body 60 is pressed as described above in this molding step, the outer peripheral surface is restricted by the outer peripheral wall 85 and is formed into a circular shape along an inner surface of the outer peripheral wall 85. Further, the inner peripheral surface is restricted by the core member 81 and is formed into a circular shape. As a result, the star-shaped polygonal body 60 is molded into the porous metal body 1 having a cylindrical shape illustrated in FIG. 2.

In this molding step S40, the mold 80 is configured by the main body portions 82, 86 and the adjusting portions 83, 87 as described above, and thus the length in the axial direction of the mold 80 is changed by removing the adjusting portions 83, 87 from the mold 80. As a result, in both the first pressing step S41 and the second pressing step S42, the star-shaped polygonal body 60 is pressed from only one side in the axial direction of the mold 80, making it possible to exert a compressing action equivalent to pressing the star-shaped polygonal body 60 from both sides in the axial direction of the mold 80 on the star-shaped polygonal body 60. That is, by simply providing the actuator for pressing the star-shaped polygonal body 60 on only one side in the axial direction of the mold 80, it is possible to achieve the same action as that in a case where an actuator for pressing the star-shaped polygonal body 60 is provided on both sides in the axial direction of the mold 80.

The above has described a case where the molding step S40 is performed using the mold 80 that allows the length in the axial direction to be changed to two forms as an example. Nevertheless, the molding step S40 can also be performed using a mold that allows the length in the axial direction to be changed to three or more forms.

It should be noted that, after this molding step S40 has been completed, the porous metal body 1 is completed though a cleaning step or the like.

The porous metal body 1 manufactured by the manufacturing method of the porous metal body 1 that includes the above steps has a high strength. Further, pores that exist in the interior of the porous metal body 1 are equally distributed in the circumferential direction. As a result, when a fluid flows in the axial direction and the radial direction, the fluid flows equally in the circumferential direction of the porous metal body 1.

EXAMPLES

The following specifically describes the details of the porous metal body 1 manufactured by the manufacturing method of the porous metal body 1 according to the present invention based on examples.

The porous metal body 1 fabricated by the manufacturing method of the porous metal body 1 according to the present invention and a conventionally used porous metal body were subjected to a pressure loss verification test and a compression strength verification test, and compared. It should be noted that the conventionally used porous metal body is a porous metal body completed by pressing an intermediary body formed midway through the manufacturing method of the porous metal body 1 of the present invention, as is. That is, the conventionally used porous metal body is completed without a star-shaped polygonal body forming step.

Example 1

Example 1 is a porous metal body obtained by fabricating the metal wire 10 made of a white annealed iron wire having a 0.36-mm diameter through the wire mesh continuous body forming step, the dividing step, the intermediary body forming step, the star-shaped polygonal body forming step, and the molding step. In the wire mesh continuous body forming step, the metal wire 10 was plain-knitted to form a wire mesh continuous body. The length in the axial direction of the porous metal body was 10 mm.

Example 2

Example 2 is a porous metal body obtained by fabricating the metal wire 10 made of a white annealed iron wire having a 0.70-mm diameter using the same manufacturing method as that in Example 1. The length in the axial direction of the porous metal body was 10 mm.

Comparative Example 1

Comparative example 1 is a porous metal body obtained by fabricating the same metal wire 10 as that in Example 1 through the wire mesh continuous body forming step, the dividing step, the intermediary body forming step, and the molding step. In the wire mesh continuous body forming step, the metal wire 10 was plain-knitted to form a wire mesh continuous body. The length in the axial direction of the porous metal body was 10 mm.

Comparative Example 2

Comparative example 2 is a porous metal body obtained by fabricating the metal wire 10 made of a white annealed iron wire having a 0.70-mm diameter using the same manufacturing method as that in Comparative example 1. The length in axial direction of the porous metal body was 10mm.

[Pressure Loss Verification Test]

A pressure loss verification test was performed for a case in which fluid was made to flow in a radial direction of the test sample, and a case in which fluid was made to flow in an axial direction of the test sample.

<Pressure Loss Verification Test in Radial Direction>

Figure 15:
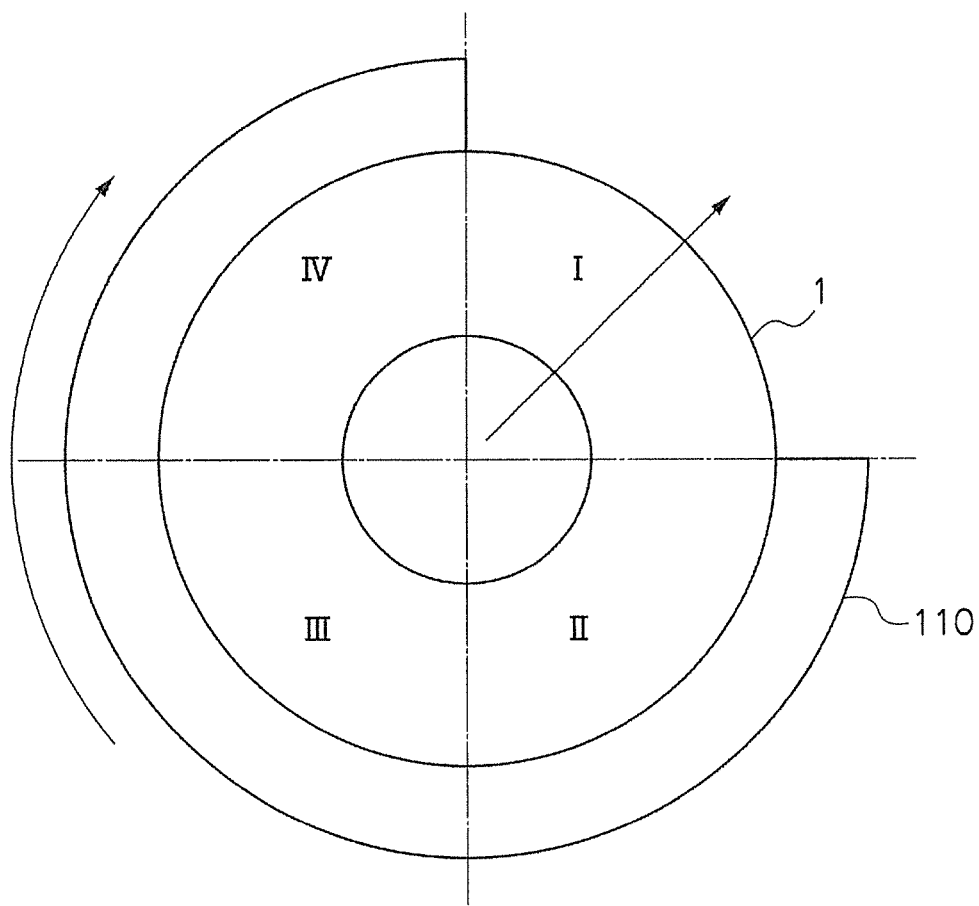
FIG. 15 is an explanatory view for explaining a form of a test sample when a fluid is made to flow in a radial direction and a pressure loss verification test is performed.

In the radial direction verification test, air was circulated from the inner peripheral side to the outer peripheral side of the test sample, and the pressure loss was measured. The verification test was performed by circulating air at flow rates of 50 liters/minute, 70 liters/minute, and 100 liters/minute. Further, the verification test, as illustrated in FIG. 15, divided the circumferential direction of the test sample into four regions I, II, III, and IV, and measured the pressure loss in each of the regions I, II, III, and IV. Specifically, the verification test was performed by blocking end surfaces on both sides in the axial direction of the porous metal body, inserting a jig 110 having a ring shape with one-quarter section in the circumferential direction omitted around the outer periphery of the test sample, and rotating the jig 110 one-quarter of a turn in the circumferential direction each time. It should be noted that the verification test was conducted on two Examples and two Comparative examples.

The evaluation was performed by calculating an average value of the measurement results of four locations in each test sample, and finding the maximum percentage of variance with respect to the average value. Here, the maximum percentage of variance refers to either the maximum variance on the positive side with respect to the average value or the maximum variance on the negative side with respect to the average value, whichever is largest.

(Test Result)

Table 1 shows the test results of the verification test.

TABLE 1

| | | Flow Rate (L/min) | | |
|---|---|---|---|---|
| | | 50 | 70 | 100 |
| Example 1 | First Sample | 7.3 | 7.8 | 6.5 |
| | Second Sample | 17.1 | 16.8 | 18.1 |
| | Average Value | 12.2 | 12.3 | 12.3 |
| Example 2 | First Sample | 14.6 | 12.0 | 11.6 |
| | Second Sample | 7.2 | 8.8 | 11.0 |

TABLE 1-continued

| | | Flow Rate (L/min) | | |
|---|---|---|---|---|
| | | 50 | 70 | 100 |
| | Average Value | 10.9 | 10.4 | 11.3 |
| Comparative Example 1 | First Sample | 37.5 | 38.1 | 33.8 |
| | Second Sample | 27.0 | 27.2 | 26.8 |
| | Average Value | 32.2 | 32.6 | 30.3 |
| Comparative Example 2 | First Sample | 38.3 | 34.3 | 34.5 |
| | Second Sample | 22.0 | 26.1 | 27.8 |
| | Average Value | 30.1 | 30.2 | 31.2 |

A first sample of Example 1, as shown in Table 1, exhibited variances with respect to the average value of 7.3% at a flow rate of 50 liters/minute, 7.8% at a flow rate of 70 liters/minute, and 6.5% at a flow rate of 100 liters/minute. Further, a second sample of Example 1 exhibited variances with respect to the average value of 17.1% at a flow rate of 50 liters/minute, 16.8% at a flow rate of 70 liters/minute, and 18.1% at a flow rate of 100 liters/minute. The averages of the first sample and the second sample were 12.2% at a flow rate of 50 liters/minute, 12.3% at a flow rate of 70 liters/minute, and 12.3% at a flow rate of 100 liters/minute.

A first sample of Example 2, as shown in Table 1, exhibited variances with respect to the average value of 14.6% at a flow rate of 50 liters/minute, 12.0% at a flow rate of 70 liters/minute, and 11.6% at a flow rate of 100 liters/minute. Further, a second sample of Example 2 exhibited variances with respect to the average value of 7.2% at a flow rate of 50 liters/minute, 8.8% at a flow rate of 70 liters/minute, and 11.0% at a flow rate of 100 liters/minute. The averages of the first sample and the second sample were 10.9% at a flow rate of 50 liters/minute, 10.4% at a flow rate of 70 liters/minute, and 11.3% at a flow rate of 100 liters/minute.

On the other hand, a first sample of Comparative example 1 exhibited variances with respect to the average value of 37.5% at a flow rate of 50 liters/minute, 38.1% at a flow rate of 70 liters/minute, and 33.8% at a flow rate of 100 liters/minute. Further, a second sample of Comparative example 1 exhibited variances with respect to the average value of 27.0% at a flow rate of 50 liters/minute, 27.2% at a flow rate of 70 liters/minute, and 26.8% at a flow rate of 100 liters/minute. The averages of the first sample and the second sample were 32.2% at a flow rate of 50 liters/minute, 32.6% at a flow rate of 70 liters/minute, and 30.3% at a flow rate of 100 liters/minute.

A first sample of Comparative example 2 exhibited variances with respect to the average value of 38.3% at a flow rate of 50 liters/minute, 34.3% at a flow rate of 70 liters/minute, and 34.5% at a flow rate of 100 liters/minute. Further, a second sample of Comparative example 2 exhibited variances with respect to the average value of 22.0% at a flow rate of 50 liters/minute, 26.1% at a flow rate of 70 liters/minute, and 27.8% at a flow rate of 100 liters/minute. The averages of the first sample and the second sample were 30.1% at a flow rate of 50 liters/minute, 30.2% at a flow rate of 70 liters/minute, and 31.2% at a flow rate of 100 liters/minute.

As understood from the above test results, the porous metal body 1 fabricated by the manufacturing method of the porous metal body 1 of the present invention has less variance in pressure loss in the circumferential direction when fluid flows in the radial direction than that of the conventional porous metal body.

<Pressure Loss Verification Test in Axial Direction>

Figure 16:
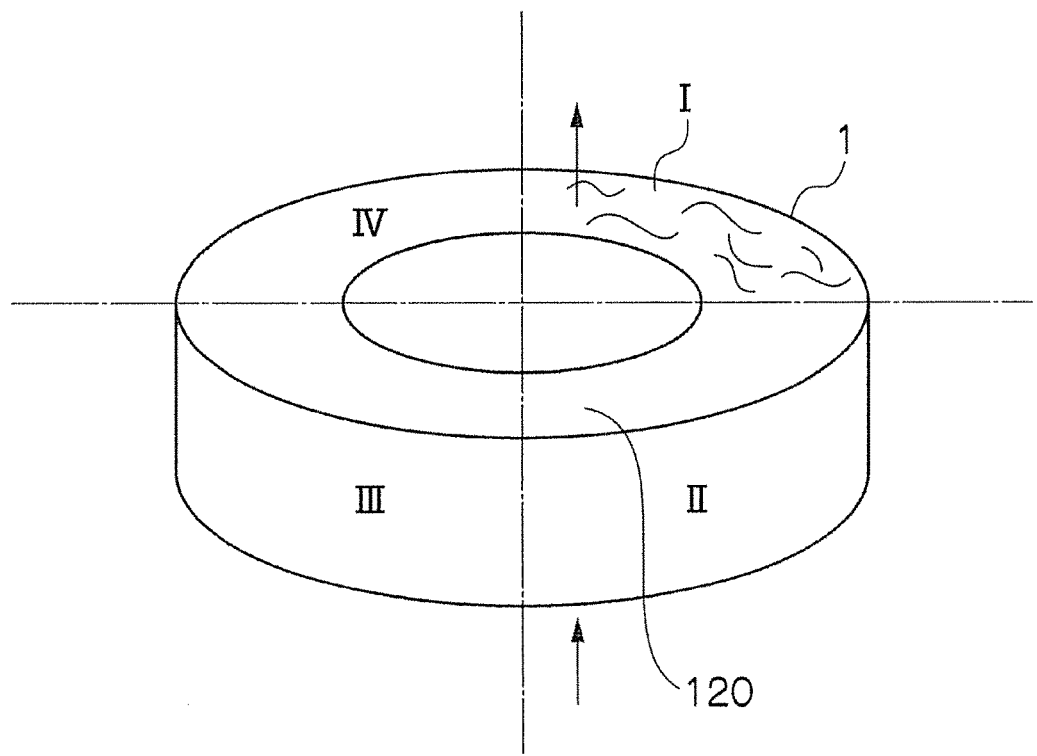
FIG. 16 is an explanatory view for explaining a form of a test sample when a fluid is made to flow in an axial direction and a pressure loss verification test is performed.

In the axial direction verification test, air was circulated from one end surface to the other end surface in the axial direction of the test sample, and the pressure loss was measured. The verification test was performed by circulating air at flow rates of 50 liters/minute, 70 liters/minute, and 100 liters/minute. Further, the verification test, as illustrated in FIG. 16, divided the circumferential direction of the test sample into four regions I, II, III, and IV, and measured the pressure loss in each of the regions I, II, III, and IV. Specifically, the verification test was performed by blocking an outer peripheral surface and an inner peripheral surface of the porous metal body, blocking a three-quarter section in the circumferential direction of both end surfaces in the axial direction using the jig 120 having a ring shape with one-quarter section in the circumferential direction omitted, and rotating the jig 120 one-quarter of a turn in the circumferential direction each time. It should be noted that the verification test was conducted on two Examples and two Comparative examples.

The evaluation was performed by calculating an average value of the measurement results of four locations in each test sample, and finding the maximum percentage of variance with respect to the average value. Here, the maximum percentage of variance refers to either the maximum variance on the positive side with respect to the average value or the maximum variance on the negative side with respect to the average value, whichever is largest.

(Test Result)

Table 2 shows the test results of the verification test.

TABLE 2

| | | Flow Rate (L/min) | | |
|---|---|---|---|---|
| | | 50 | 70 | 100 |
| Example 1 | First Sample | 11.9 | 16.3 | 14.6 |
| | Second Sample | 13.9 | 8.0 | 7.6 |
| | Average Value | 12.9 | 12.2 | 11.2 |
| Example 2 | First Sample | 11.5 | 16.5 | 13.4 |
| | Second Sample | 20.8 | 8.9 | 8.8 |
| | Average Value | 16.2 | 12.7 | 11.1 |
| Comparative Example 1 | First Sample | 37.4 | 37.4 | 35.9 |
| | Second Sample | 26.7 | 27.3 | 26.3 |
| | Average Value | 32.1 | 32.4 | 31.1 |
| Comparative Example 2 | First Sample | 44.9 | 42.5 | 52.0 |
| | Second Sample | 23.1 | 26.6 | 28.5 |
| | Average Value | 34.0 | 34.6 | 40.3 |

A first sample of Example 1, as shown in Table 2, exhibited variances with respect to the average value of 11.9% at a flow rate of 50 liters/minute, 16.3% at a flow rate of 70 liters/minute, and 14.9% at a flow rate of 100 liters/minute. Further, a second sample of Example 1 exhibited variances with respect to the average value of 13.9% at a flow rate of 50 liters/minute, 8.0% at a flow rate of 70 liters/minute, and 7.6% at a flow rate of 100 liters/minute. The averages of the first sample and the second sample were 12.9% at a flow rate of 50 liters/minute, 12.2% at a flow rate of 70 liters/minute, and 11.2% at a flow rate of 100 liters/minute.

A first sample of Example 2, as shown in Table 2, exhibited variances with respect to the average value of 11.5% at a flow rate of 50 liters/minute, 16.5% at a flow rate of 70 liters/minute, and 13.4% at a flow rate of 100 liters/minute. Further, a second sample of Example 2 exhibited variances with respect to the average value of 20.8% at a flow rate of 50 liters/minute, 8.9% at a flow rate of 70 liters/minute, and 8.8% at a flow rate of 100 liters/minute. The averages of the first sample and the second sample were 16.2% at a flow rate of 50 liters/minute, 12.7% at a flow rate of 70 liters/minute, and 11.1% at a flow rate of 100 liters/minute.

On the other hand, a first sample of Comparative example 1 exhibited variances with respect to the average value of 37.4% at a flow rate of 50 liters/minute, 37.4% at a flow rate of 70 liters/minute, and 35.9% at a flow rate of 100 liters/minute. Further, a second sample of Comparative example 1 exhibited variances with respect to the average value of 26.7% at a flow rate of 50 liters/minute, 27.3% at a flow rate of 70 liters/minute, and 26.3% at a flow rate of 100 liters/minute. The averages of the first sample and the second sample were 32.1% at a flow rate of 50 liters/minute, 32.4% at a flow rate of 70 liters/minute, and 31.1% at a flow rate of 100 liters/minute.

Further, a first sample of Comparative example 2 exhibited variances with respect to the average value of 44.9% at a flow rate of 50 liters/minute, 42.5% at a flow rate of 70 liters/minute, and 52.0% at a flow rate of 100 liters/minute. Further, a second sample of Comparative example 2 exhibited variances with respect to the average value of 23.1% at a flow rate of 50 liters/minute, 26.6% at a flow rate of 70 liters/minute, and 28.5% at a flow rate of 100 liters/minute. The averages of the first sample and the second sample were 34.0% at a flow rate of 50 liters/minute, 34.6% at a flow rate of 70 liters/minute, and 40.3% at a flow rate of 100 liters/minute.

As understood from the above test results, the porous metal body 1 fabricated by the manufacturing method of the porous metal body 1 of the present invention has less variance in pressure loss in the circumferential direction when fluid flows in the axial direction than that of the conventional porous metal body.

[Compression Strength Verification Test]

In the compression strength verification test, the test sample was compressed in the axial direction using a Tensilon universal testing machine (RTG-1310 manufactured by A&D), and the relationship between compression load and displacement was measured. The verification test was performed with a speed for compressing the test sample set to 5 mm/minute, and the load limit set to 5000 newtons. It should be noted that the verification test was conducted once on each of the Examples 1 and 2 and Comparative examples 1 and 2.

(Test Result)

Figure 17:
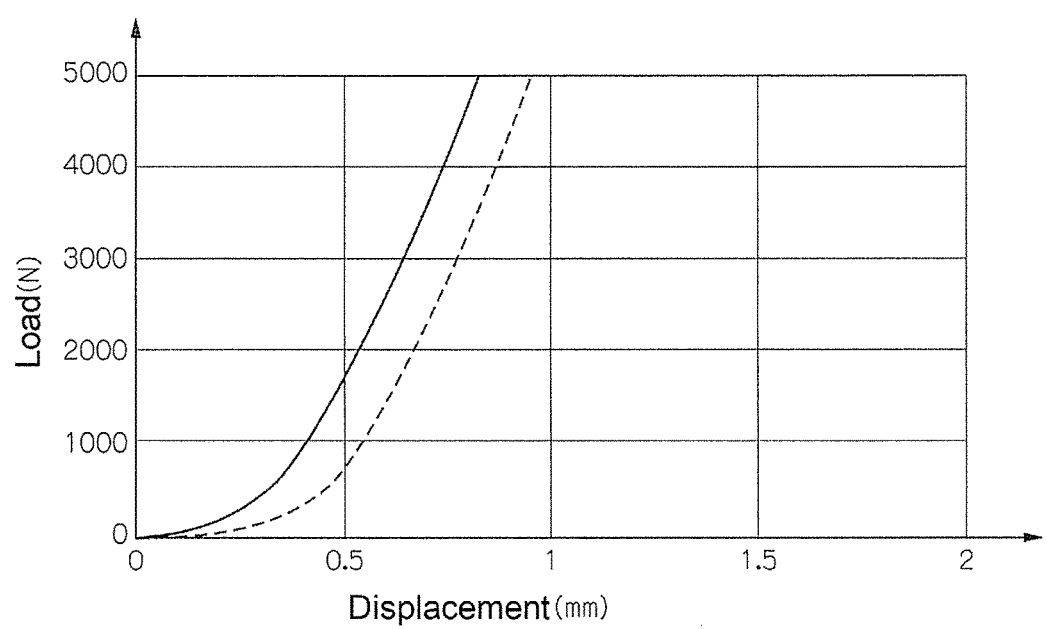
FIG. 17 is a graph showing the results of a compression strength verification test.

The graph shown in FIG. 17 indicates the test results of Example 1 and Comparative example 1. The horizontal axis of the graph indicates displacement, and the vertical axis of the graph indicates compression load. Further, the solid line indicates Example 1, and the dashed line indicates Comparative example 1.

Example 1, as indicated by the solid line in the graph in FIG. 17, exhibited a displacement of less than 0.5 mm even at a load of 1000 newtons, and approximately 0.5 mm at a load of 2000 newtons. Then, the displacement was approximately 0.82 mm at a load of 5000 newtons.

On the other hand, Comparative example 1, as indicated by the dashed line in the graph in FIG. 17, exhibited a greater overall shift to the right than that of the graph of Example 1. Specifically, at a load of 1000 newtons, the displacement already reached approximately 0.5 mm. Further, the displacement was approximately 0.94 mm at a load of 5000 newtons.

Figure 18:
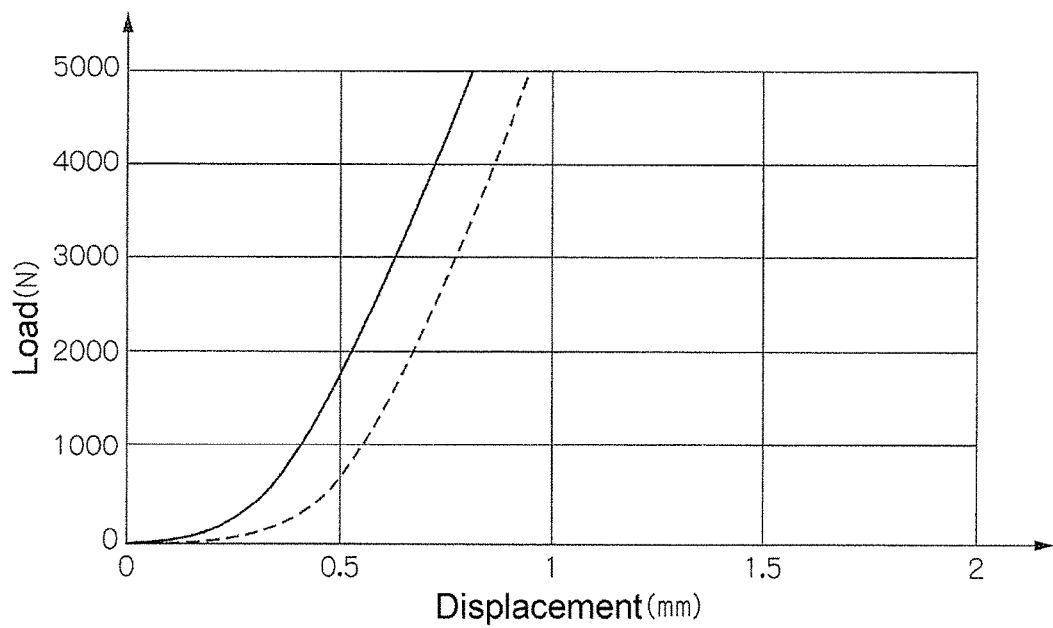
FIG. 18 is a graph showing the results of a compression strength verification test.

The graph shown in FIG. 18 indicates the test results of Example 2 and Comparative example 2. The horizontal axis of the graph indicates displacement, and the vertical axis of the graph indicates compression load. Further, the solid line indicates Example 2, and the dashed line indicates Comparative example 2.

Example 2, as indicated by the solid line in the graph in FIG. 18, exhibited a displacement of less than 0.5 mm even at a load of 1000 newtons, and approximately 0.5 mm at a load of 2000 newtons. Then, the displacement was approximately 0.80 mm at a load of 5000 newtons.

On the other hand, Comparative example 2, as indicated by the dashed line in the graph in FIG. 18, exhibited a greater overall shift to the right than that of the graph of Example 2. Specifically, at a load of 1000 newtons, the displacement already reached approximately 0.5 mm. Further, the displacement was approximately 0.94 mm at a load of 5000 newtons.

As indicated by the above test results, when the porous metal body 1 fabricated by the manufacturing method of the porous metal body 1 according to the present invention and the conventional porous metal body were compressed under the same conditions, the porous metal body 1 fabricated by the manufacturing method of the porous metal body 1 of the present invention exhibited less displacement and greater strength than the conventional porous metal body.

Further, the differences between the two were studied by cutting the porous metal body 1 manufactured by the porous metal body manufacturing method according to the present invention and the porous metal body manufactured by the conventional manufacturing method, and enlarging and closely examining the cross sections under a microscope. At the time of filing the present application, the practical method for examining the internal structure of the porous metal body without excessive economic expenditure or excessive time requirements was to cut the porous metal body and enlarge and examine the cross section under a microscope.

As a result of cutting the porous metal bodies and enlarging and examining the cross sections under a microscope, differences between the internal structure of the porous metal body manufactured by the manufacturing method according to the present invention and the internal structure of the porous metal body manufactured by the conventional manufacturing method could not be confirmed.

DESCRIPTIONS OF REFERENCE NUMERALS

1 Porous metal body
2 Outer peripheral surface
3 Inner peripheral surface
4 End surface
5 End surface
10 Metal wire
20 Knitting machine
21 Main body portion of knitting machine
22 Guide needle
30 Wire mesh continuous body
31 Tubular wire mesh body
32 Intermediary body
33 Outer peripheral portion of intermediary body
34 Inner peripheral portion of intermediary body
40, 140 Device used in star-shaped polygonal body forming step of first type
41, 141 Base
42, 142 Tab
43, 143 Pressing portion
45, 145 Receiving portion
46, 146 Ring portion
47, 147 Partitioning portion
50, 150 Device used in star-shaped polygonal body forming step of second type
51, 151 First gear
52, 152 Second gear
60, 160 Star-shaped polygonal body
61, 161 Protrusion
62, 162 Recess
70 Device used in star-shaped polygonal body compressing step
71 Arm
72 Pressing surface
75 Base
80 Mold
80a First end
80b Second end
81 Core member
82 Core member main body portion
83 Core member adjusting portion
85 Outer peripheral wall
86 Outer peripheral wall main body portion
87 Outer peripheral wall adjusting portion
90 Block
101 First auxiliary member
102 Second auxiliary member
103 Third auxiliary member
104 Pressing jig

What is claimed is:

1. A porous metal body manufacturing method, comprising at least:
a preparation step of preparing an intermediary body made of a tubular wire mesh;
a star-shaped polygonal body forming step of forming a star-shaped polygonal body by alternately forming, in a circumferential direction of the intermediary body, a plurality of protrusions protruding radially outward and a plurality of recesses receding radially inward; and
a molding step of inserting the star-shaped polygonal body into a mold that restricts an inner peripheral side and an outer peripheral side of the star-shaped polygonal body and compressing the star-shaped polygonal body from one side in the axial direction of the star-shaped polygonal body to form the porous metal body having a cylindrical shape.

2. The porous metal body manufacturing method according to claim 1, wherein:
the preparation step is a step of knitting a metal wire to form a tubular wire mesh, and forming a tubular intermediary body comprising an inner peripheral portion and an outer peripheral portion from the wire mesh;
the mold used in the molding step is configured by a core member that restricts an inner peripheral side of the star-shaped polygonal body, and an outer peripheral wall that restricts an outer peripheral side of the star-shaped polygonal body;
the mold is configured to be changeable to at least two forms differing in length in an axial direction thereof; and
the molding step comprises at least a first pressing step of compressing the star-shaped polygonal body from one side in the axial direction using the mold of the form having a long length in the axial direction and, after the first pressing step, a second pressing step of further compressing the star-shaped polygonal body from one side in the axial direction using the mold of the form having a short length in the axial direction.

3. The porous metal body manufacturing method according to claim 1, wherein
the star-shaped polygonal body forming step is a step of forming the star-shaped polygonal body by pressing a plurality of tabs that are regularly spaced apart in the circumferential direction and move in the radial direction on the intermediary body from an outer side in a radial direction of the intermediary body, thereby forming the recesses in positions where the tabs were pressed and forming the protrusions in positions between the tabs.

4. The porous metal body manufacturing method according to claim 1, wherein
the star-shaped polygonal body forming step is a step of forming the star-shaped polygonal body by engaging a first gear disposed on an outer side of the intermediary body and a second gear disposed on an inner side of the intermediary body while moving the intermediary body in the circumferential direction, thereby forming the recesses in positions of the intermediary body corresponding to tooth ridges of the first gear and forming the protrusions in positions of the intermediary body corresponding to tooth ridges of the second gear.

5. The porous metal body manufacturing method according to claim 3, wherein
the star-shaped polygonal body forming step is a step of forming the star-shaped polygonal body by diagonally inclining the plurality of protrusions and the plurality of recesses with respect to the axial direction of the intermediary body.

6. The porous metal body manufacturing method according to claim 2, wherein:
the core member and the outer peripheral wall each comprise a main body portion and a length adjusting portion removable from the main body portion;
the first pressing step is a step of compressing the star-shaped polygonal body using the mold made of the core member and the outer peripheral wall with the length adjusting portions assembled with the main body portions; and
the second pressing step is a step of compressing the star-shaped polygonal body using the mold made of the core member and the outer peripheral wall with the length adjusting portions removed from the main body portions.

7. The porous metal body manufacturing method according to claim 1, wherein:
the preparation step comprises a wire mesh continuous body forming step of forming a tubular wire mesh continuous body continuous in the axial direction by knitting a metal wire;
a dividing step of dividing the wire mesh continuous body into a plurality of tubular wire mesh bodies having a fixed length in the axial direction; and
an intermediary body forming step of forming an intermediary body by folding a side wall portion of the tubular wire mesh body in the axial direction.

8. The porous metal body manufacturing method according to claim 1, further comprising:
a star-shaped polygonal body compressing step of forming a compressed star-shaped polygonal body by pressing the star-shaped polygonal body formed by the star-shaped polygonal body forming step from an outer side to an inner side in the radial direction, thereby compressing the star-shaped polygonal body toward a center;
the compressed star-shaped polygonal body being inserted into the mold in the molding step.

9. The porous metal body manufacturing method according to claim 4, wherein
the star-shaped polygonal body forming step is a step of forming the star-shaped polygonal body by diagonally inclining the plurality of protrusions and the plurality of recesses with respect to the axial direction of the intermediary body.

* * * * *